United States Patent
Jeyaraman et al.

(10) Patent No.: US 10,855,700 B1
(45) Date of Patent: *Dec. 1, 2020

(54) POST-INTRUSION DETECTION OF CYBER-ATTACKS DURING LATERAL MOVEMENT WITHIN NETWORKS

(71) Applicant: FireEye, Inc., Milpitas, CA (US)

(72) Inventors: Sundararaman Jeyaraman, Hayward, CA (US); Ramaswamy Ramaswamy, Fremont, CA (US)

(73) Assignee: FireEye, Inc., Milpitas, CA (US)

( * ) Notice: Subject to any disclaimer, the term of this patent is extended or adjusted under 35 U.S.C. 154(b) by 92 days.

This patent is subject to a terminal disclaimer.

(21) Appl. No.: 16/024,685

(22) Filed: Jun. 29, 2018

Related U.S. Application Data

(63) Continuation-in-part of application No. 15/638,262, filed on Jun. 29, 2017, now Pat. No. 10,601,848.

(51) Int. Cl.
*H04L 29/06* (2006.01)

(52) U.S. Cl.
CPC ...... *H04L 63/1416* (2013.01); *H04L 63/1425* (2013.01)

(58) Field of Classification Search
CPC .................. H04L 63/1416; H04L 63/1425
(Continued)

(56) References Cited

U.S. PATENT DOCUMENTS

| | | |
|---|---|---|
| 4,292,580 A | 9/1981 | Ott et al. |
| 5,175,732 A | 12/1992 | Hendel et al. |

(Continued)

FOREIGN PATENT DOCUMENTS

| | | |
|---|---|---|
| EP | 3107026 A1 | 12/2016 |
| GB | 2439806 A | 1/2008 |

(Continued)

OTHER PUBLICATIONS

Didier Stevens, "Malicious PDF Documents Explained", Security & Privacy, IEEE, IEEE Service Center, Los Alamitos, CA, US, vol. 9, No. 1, Jan. 1, 2011, pp. 80-82, XP011329453, ISSN: 1540-7993, DOI: 10.1109/MSP.2011.14.

(Continued)

*Primary Examiner* — Aravind K Moorthy
(74) *Attorney, Agent, or Firm* — Rutan & Tucker, LLP

(57) ABSTRACT

A method and system to detect cyber-attacks by analyzing client-server or other east-west traffic within an enterprise network is disclosed. East-west traffic comprises communications between network devices within the enterprise network, in contradistinction to north-south traffic which involves communications intended to traverse the periphery of the enterprise network. The system includes a network interface to receive the network traffic; analysis logic to analyze communications within the received network traffic to identify a set of indicators; correlation logic to assemble one or more groups of weak indicators from the set of indicators, and conduct an analysis to determine whether each of the groups of weak indicators is correlated with known malicious patterns or sequences of indicators, thereby producing at least one strong indicator from which a determination can be made of whether a cyber-attack is being conducted.

31 Claims, 10 Drawing Sheets

(58) Field of Classification Search
USPC .......................................................... 726/23
See application file for complete search history.

(56) References Cited

U.S. PATENT DOCUMENTS

| | | | |
|---|---|---|---|
| 5,319,776 A | 6/1994 | Hile et al. |
| 5,440,723 A | 8/1995 | Arnold et al. |
| 5,490,249 A | 2/1996 | Miller |
| 5,657,473 A | 8/1997 | Killean et al. |
| 5,802,277 A | 9/1998 | Cowland |
| 5,842,002 A | 11/1998 | Schnurer et al. |
| 5,878,560 A | 3/1999 | Johnson |
| 5,960,170 A | 9/1999 | Chen et al. |
| 5,978,917 A | 11/1999 | Chi |
| 5,983,348 A | 11/1999 | Ji |
| 6,013,455 A | 1/2000 | Bandman et al. |
| 6,088,803 A | 7/2000 | Tso et al. |
| 6,092,194 A | 7/2000 | Touboul |
| 6,094,677 A | 7/2000 | Capek et al. |
| 6,108,799 A | 8/2000 | Boulay et al. |
| 6,154,844 A | 11/2000 | Touboul et al. |
| 6,269,330 B1 | 7/2001 | Cidon et al. |
| 6,272,641 B1 | 8/2001 | Ji |
| 6,279,113 B1 | 8/2001 | Vaidya |
| 6,298,445 B1 | 10/2001 | Shostack et al. |
| 6,357,008 B1 | 3/2002 | Nachenberg |
| 6,424,627 B1 | 7/2002 | Sorhaug et al. |
| 6,442,696 B1 | 8/2002 | Wray et al. |
| 6,484,315 B1 | 11/2002 | Ziese |
| 6,487,666 B1 | 11/2002 | Shanklin et al. |
| 6,493,756 B1 | 12/2002 | O'Brien et al. |
| 6,550,012 B1 | 4/2003 | Villa et al. |
| 6,775,657 B1 | 8/2004 | Baker |
| 6,831,893 B1 | 12/2004 | Ben Nun et al. |
| 6,832,367 B1 | 12/2004 | Choi et al. |
| 6,895,550 B2 | 5/2005 | Kanchirayappa et al. |
| 6,898,632 B2 | 5/2005 | Gordy et al. |
| 6,907,396 B1 | 6/2005 | Muttik et al. |
| 6,941,348 B2 | 9/2005 | Petry et al. |
| 6,971,097 B1 | 11/2005 | Wallman |
| 6,981,279 B1 | 12/2005 | Arnold et al. |
| 7,007,107 B1 | 2/2006 | Ivchenko et al. |
| 7,028,179 B2 | 4/2006 | Anderson et al. |
| 7,043,757 B2 | 5/2006 | Hoefelmeyer et al. |
| 7,058,822 B2 | 6/2006 | Edery et al. |
| 7,069,316 B1 | 6/2006 | Gryaznov |
| 7,080,407 B1 | 7/2006 | Zhao et al. |
| 7,080,408 B1 | 7/2006 | Pak et al. |
| 7,093,002 B2 | 8/2006 | Wolff et al. |
| 7,093,239 B1 | 8/2006 | van der Made |
| 7,096,498 B2 | 8/2006 | Judge |
| 7,100,201 B2 | 8/2006 | Izatt |
| 7,107,617 B2 | 9/2006 | Hursey et al. |
| 7,159,149 B2 | 1/2007 | Spiegel et al. |
| 7,213,260 B2 | 5/2007 | Judge |
| 7,231,667 B2 | 6/2007 | Jordan |
| 7,240,364 B1 | 7/2007 | Branscomb et al. |
| 7,240,368 B1 | 7/2007 | Roesch et al. |
| 7,243,371 B1 | 7/2007 | Kasper et al. |
| 7,249,175 B1 | 7/2007 | Donaldson |
| 7,287,278 B2 | 10/2007 | Liang |
| 7,308,716 B2 | 12/2007 | Danford et al. |
| 7,328,453 B2 | 2/2008 | Merkle, Jr. et al. |
| 7,346,486 B2 | 3/2008 | Ivancic et al. |
| 7,356,736 B2 | 4/2008 | Natvig |
| 7,386,888 B2 | 6/2008 | Liang et al. |
| 7,392,542 B2 | 6/2008 | Bucher |
| 7,418,729 B2 | 8/2008 | Szor |
| 7,428,300 B1 | 9/2008 | Drew et al. |
| 7,441,272 B2 | 10/2008 | Durham et al. |
| 7,448,084 B1 | 11/2008 | Apap et al. |
| 7,458,098 B2 | 11/2008 | Judge et al. |
| 7,464,404 B2 | 12/2008 | Carpenter et al. |
| 7,464,407 B2 | 12/2008 | Nakae et al. |
| 7,467,408 B1 | 12/2008 | O'Toole, Jr. |
| 7,478,428 B1 | 1/2009 | Thomlinson |
| 7,480,773 B1 | 1/2009 | Reed |
| 7,487,543 B2 | 2/2009 | Arnold et al. |
| 7,496,960 B1 | 2/2009 | Chen et al. |
| 7,496,961 B2 | 2/2009 | Zimmer et al. |
| 7,519,990 B1 | 4/2009 | Xie |
| 7,523,493 B2 | 4/2009 | Liang et al. |
| 7,530,104 B1 | 5/2009 | Thrower et al. |
| 7,540,025 B2 | 5/2009 | Tzadikario |
| 7,546,638 B2 | 6/2009 | Anderson et al. |
| 7,565,550 B2 | 7/2009 | Liang et al. |
| 7,568,233 B1 | 7/2009 | Szor et al. |
| 7,584,455 B2 | 9/2009 | Ball |
| 7,603,715 B2 | 10/2009 | Costa et al. |
| 7,607,171 B1 | 10/2009 | Marsden et al. |
| 7,639,714 B2 | 12/2009 | Stolfo et al. |
| 7,644,441 B2 | 1/2010 | Schmid et al. |
| 7,657,419 B2 | 2/2010 | van der Made |
| 7,676,841 B2 | 3/2010 | Sobchuk et al. |
| 7,698,548 B2 | 4/2010 | Shelest et al. |
| 7,707,633 B2 | 4/2010 | Danford et al. |
| 7,712,136 B2 | 5/2010 | Sprosts et al. |
| 7,730,011 B1 | 6/2010 | Deninger et al. |
| 7,739,740 B1 | 6/2010 | Nachenberg et al. |
| 7,779,463 B2 | 8/2010 | Stolfo et al. |
| 7,784,097 B1 | 8/2010 | Stolfo et al. |
| 7,832,008 B1 | 11/2010 | Kraemer |
| 7,836,502 B1 | 11/2010 | Zhao et al. |
| 7,849,506 B1 | 12/2010 | Dansey et al. |
| 7,854,007 B2 | 12/2010 | Sprosts et al. |
| 7,869,073 B2 | 1/2011 | Oshima |
| 7,877,803 B2 | 1/2011 | Enstone et al. |
| 7,904,959 B2 | 3/2011 | Sidiroglou et al. |
| 7,908,660 B2 | 3/2011 | Bahl |
| 7,930,738 B1 | 4/2011 | Petersen |
| 7,937,387 B2 | 5/2011 | Frazier et al. |
| 7,937,761 B1 | 5/2011 | Bennett |
| 7,949,849 B2 | 5/2011 | Lowe et al. |
| 7,996,556 B2 | 8/2011 | Raghavan et al. |
| 7,996,836 B1 | 8/2011 | McCorkendale et al. |
| 7,996,904 B1 | 8/2011 | Chiueh et al. |
| 7,996,905 B2 | 8/2011 | Arnold et al. |
| 8,006,305 B2 | 8/2011 | Aziz |
| 8,010,667 B2 | 8/2011 | Zhang et al. |
| 8,020,206 B2 | 9/2011 | Hubbard et al. |
| 8,028,338 B1 | 9/2011 | Schneider et al. |
| 8,042,184 B1 | 10/2011 | Batenin |
| 8,045,094 B2 | 10/2011 | Teragawa |
| 8,045,458 B2 | 10/2011 | Alperovitch et al. |
| 8,069,484 B2 | 11/2011 | McMillan et al. |
| 8,087,086 B1 | 12/2011 | Lai et al. |
| 8,171,553 B2 | 5/2012 | Aziz et al. |
| 8,176,049 B2 | 5/2012 | Deninger et al. |
| 8,176,480 B1 | 5/2012 | Spertus |
| 8,201,246 B1 | 6/2012 | Wu et al. |
| 8,204,984 B1 | 6/2012 | Aziz et al. |
| 8,214,905 B1 | 7/2012 | Doukhvalov et al. |
| 8,220,055 B1 | 7/2012 | Kennedy |
| 8,225,288 B2 | 7/2012 | Miller et al. |
| 8,225,373 B2 | 7/2012 | Kraemer |
| 8,230,505 B1 * | 7/2012 | Ahrens .................. G06Q 10/02 726/23 |
| 8,233,882 B2 | 7/2012 | Rogel |
| 8,234,640 B1 | 7/2012 | Fitzgerald et al. |
| 8,234,709 B2 | 7/2012 | Viljoen et al. |
| 8,239,944 B1 | 8/2012 | Nachenberg et al. |
| 8,260,914 B1 | 9/2012 | Ranjan |
| 8,266,091 B1 | 9/2012 | Gubin et al. |
| 8,286,251 B2 | 10/2012 | Eker et al. |
| 8,291,499 B2 | 10/2012 | Aziz et al. |
| 8,307,435 B1 | 11/2012 | Mann et al. |
| 8,307,443 B2 | 11/2012 | Wang et al. |
| 8,312,545 B2 | 11/2012 | Tuvell et al. |
| 8,321,936 B1 | 11/2012 | Green et al. |
| 8,321,941 B2 | 11/2012 | Tuvell et al. |
| 8,332,571 B1 | 12/2012 | Edwards, Sr. |
| 8,365,286 B2 | 1/2013 | Poston |
| 8,365,297 B1 | 1/2013 | Parshin et al. |
| 8,370,938 B1 | 2/2013 | Daswani et al. |

(56) References Cited

U.S. PATENT DOCUMENTS

| | | |
|---|---|---|
| 8,370,939 B2 | 2/2013 | Zaitsev et al. |
| 8,375,444 B2 | 2/2013 | Aziz et al. |
| 8,381,299 B2 | 2/2013 | Stolfo et al. |
| 8,402,529 B1 | 3/2013 | Green et al. |
| 8,464,340 B2 | 6/2013 | Ahn et al. |
| 8,479,174 B2 | 7/2013 | Chiriac |
| 8,479,276 B1 | 7/2013 | Vaystikh et al. |
| 8,479,291 B1 | 7/2013 | Bodke |
| 8,510,827 B1 | 8/2013 | Leake et al. |
| 8,510,828 B1 | 8/2013 | Guo et al. |
| 8,510,842 B2 | 8/2013 | Amit et al. |
| 8,516,478 B1 | 8/2013 | Edwards et al. |
| 8,516,590 B1 | 8/2013 | Ranadive et al. |
| 8,516,593 B2 | 8/2013 | Aziz |
| 8,522,348 B2 | 8/2013 | Chen et al. |
| 8,528,086 B1 | 9/2013 | Aziz |
| 8,533,824 B2 | 9/2013 | Hutton et al. |
| 8,539,582 B1 | 9/2013 | Aziz et al. |
| 8,549,638 B2 | 10/2013 | Aziz |
| 8,555,391 B1 | 10/2013 | Demir et al. |
| 8,561,177 B1 | 10/2013 | Aziz et al. |
| 8,566,476 B2 | 10/2013 | Shiffer et al. |
| 8,566,946 B1 | 10/2013 | Aziz et al. |
| 8,584,094 B2 | 11/2013 | Dadhia et al. |
| 8,584,234 B1 | 11/2013 | Sobel et al. |
| 8,584,239 B2 | 11/2013 | Aziz et al. |
| 8,595,834 B2 | 11/2013 | Xie et al. |
| 8,627,476 B1 | 1/2014 | Satish et al. |
| 8,635,696 B1 | 1/2014 | Aziz |
| 8,682,054 B2 | 3/2014 | Xue et al. |
| 8,682,812 B1 | 3/2014 | Ranjan |
| 8,689,333 B2 | 4/2014 | Aziz |
| 8,695,096 B1 | 4/2014 | Zhang |
| 8,713,631 B1 | 4/2014 | Pavlyushchik |
| 8,713,681 B2 | 4/2014 | Silberman et al. |
| 8,726,392 B1 | 5/2014 | McCorkendale et al. |
| 8,739,280 B2 | 5/2014 | Chess et al. |
| 8,776,229 B1 | 7/2014 | Aziz |
| 8,782,792 B1 | 7/2014 | Bodke |
| 8,789,172 B2 | 7/2014 | Stolfo et al. |
| 8,789,178 B2 | 7/2014 | Kejriwal et al. |
| 8,793,278 B2 | 7/2014 | Frazier et al. |
| 8,793,787 B2 | 7/2014 | Ismael et al. |
| 8,805,947 B1 | 8/2014 | Kuzkin et al. |
| 8,806,647 B1 | 8/2014 | Daswani et al. |
| 8,832,829 B2 | 9/2014 | Manni et al. |
| 8,850,570 B1 | 9/2014 | Ramzan |
| 8,850,571 B2 | 9/2014 | Staniford et al. |
| 8,881,234 B2 | 11/2014 | Narasimhan et al. |
| 8,881,271 B2 | 11/2014 | Butler, II |
| 8,881,282 B1 | 11/2014 | Aziz et al. |
| 8,898,788 B1 | 11/2014 | Aziz et al. |
| 8,935,779 B2 | 1/2015 | Manni et al. |
| 8,949,257 B2 | 2/2015 | Shiffer et al. |
| 8,984,638 B1 | 3/2015 | Aziz et al. |
| 8,990,939 B2 | 3/2015 | Staniford et al. |
| 8,990,944 B1 | 3/2015 | Singh et al. |
| 8,997,219 B2 | 3/2015 | Staniford et al. |
| 9,009,822 B1 | 4/2015 | Ismael et al. |
| 9,009,823 B1 | 4/2015 | Ismael et al. |
| 9,027,135 B1 | 5/2015 | Aziz |
| 9,071,638 B1 | 6/2015 | Aziz et al. |
| 9,104,867 B1 | 8/2015 | Thioux et al. |
| 9,106,630 B2 | 8/2015 | Frazier et al. |
| 9,106,694 B2 | 8/2015 | Aziz et al. |
| 9,118,715 B2 | 8/2015 | Staniford et al. |
| 9,159,035 B1 | 10/2015 | Ismael et al. |
| 9,171,160 B2 | 10/2015 | Vincent et al. |
| 9,176,843 B1 | 11/2015 | Ismael et al. |
| 9,189,627 B1 | 11/2015 | Islam |
| 9,195,829 B1 | 11/2015 | Goradia et al. |
| 9,197,664 B1 | 11/2015 | Aziz et al. |
| 9,223,972 B1 | 12/2015 | Vincent et al. |
| 9,225,740 B1 | 12/2015 | Ismael et al. |
| 9,241,010 B1 | 1/2016 | Bennett et al. |
| 9,251,343 B1 | 2/2016 | Vincent et al. |
| 9,262,635 B2 | 2/2016 | Paithane et al. |
| 9,268,936 B2 | 2/2016 | Butler |
| 9,275,229 B2 | 3/2016 | LeMasters |
| 9,282,109 B1 | 3/2016 | Aziz et al. |
| 9,292,686 B2 | 3/2016 | Ismael et al. |
| 9,294,501 B2 | 3/2016 | Mesdaq et al. |
| 9,300,686 B2 | 3/2016 | Pidathala et al. |
| 9,306,960 B1 | 4/2016 | Aziz |
| 9,306,974 B1 | 4/2016 | Aziz et al. |
| 9,311,479 B1 | 4/2016 | Manni et al. |
| 9,336,239 B1* | 5/2016 | Hoffmann ............ G06F 16/583 |
| 9,355,247 B1 | 5/2016 | Thioux et al. |
| 9,356,944 B1 | 5/2016 | Aziz |
| 9,363,280 B1 | 6/2016 | Rivlin et al. |
| 9,367,681 B1 | 6/2016 | Ismael et al. |
| 9,398,028 B1 | 7/2016 | Karandikar et al. |
| 9,413,781 B2 | 8/2016 | Cunningham et al. |
| 9,426,071 B1 | 8/2016 | Caldejon et al. |
| 9,430,646 B1 | 8/2016 | Mushtaq et al. |
| 9,432,389 B1 | 8/2016 | Khalid et al. |
| 9,438,613 B1 | 9/2016 | Paithane et al. |
| 9,438,622 B1 | 9/2016 | Staniford et al. |
| 9,438,623 B1 | 9/2016 | Thioux et al. |
| 9,459,901 B2 | 10/2016 | Jung et al. |
| 9,467,460 B1 | 10/2016 | Otvagin et al. |
| 9,483,644 B1 | 11/2016 | Paithane et al. |
| 9,495,180 B2 | 11/2016 | Ismael |
| 9,497,213 B2 | 11/2016 | Thompson et al. |
| 9,507,935 B2 | 11/2016 | Ismael et al. |
| 9,516,057 B2 | 12/2016 | Aziz |
| 9,519,782 B2 | 12/2016 | Aziz et al. |
| 9,536,091 B2 | 1/2017 | Paithane et al. |
| 9,537,972 B1 | 1/2017 | Edwards et al. |
| 9,560,059 B1 | 1/2017 | Islam |
| 9,565,202 B1 | 2/2017 | Kindlund et al. |
| 9,591,015 B1 | 3/2017 | Amin et al. |
| 9,591,020 B1 | 3/2017 | Aziz |
| 9,594,904 B1 | 3/2017 | Jain et al. |
| 9,594,905 B1 | 3/2017 | Ismael et al. |
| 9,594,912 B1 | 3/2017 | Thioux et al. |
| 9,609,007 B1 | 3/2017 | Rivlin et al. |
| 9,626,509 B1 | 4/2017 | Khalid et al. |
| 9,628,498 B1 | 4/2017 | Aziz et al. |
| 9,628,506 B1 | 4/2017 | Plan et al. |
| 9,628,507 B2 | 4/2017 | Haq et al. |
| 9,633,134 B2 | 4/2017 | Ross |
| 9,635,039 B1 | 4/2017 | Islam et al. |
| 9,641,546 B1 | 5/2017 | Manni et al. |
| 9,654,485 B1 | 5/2017 | Neumann |
| 9,661,009 B1 | 5/2017 | Karandikar et al. |
| 9,661,018 B1 | 5/2017 | Aziz |
| 9,674,298 B1 | 6/2017 | Edwards et al. |
| 9,680,862 B2 | 6/2017 | Ismael et al. |
| 9,690,606 B1 | 6/2017 | Ha et al. |
| 9,690,933 B1 | 6/2017 | Singh et al. |
| 9,690,935 B2 | 6/2017 | Shiffer et al. |
| 9,690,936 B1 | 6/2017 | Malik et al. |
| 9,736,179 B2 | 8/2017 | Ismael |
| 9,740,857 B2 | 8/2017 | Ismael et al. |
| 9,747,446 B1 | 8/2017 | Pidathala et al. |
| 9,756,074 B2 | 9/2017 | Aziz et al. |
| 9,773,112 B1 | 9/2017 | Rathor et al. |
| 9,781,144 B1 | 10/2017 | Otvagin et al. |
| 9,787,700 B1 | 10/2017 | Amin et al. |
| 9,787,706 B1 | 10/2017 | Otvagin et al. |
| 9,792,196 B1 | 10/2017 | Ismael et al. |
| 9,824,209 B1 | 11/2017 | Ismael et al. |
| 9,824,211 B2 | 11/2017 | Wilson |
| 9,824,216 B1 | 11/2017 | Khalid et al. |
| 9,825,976 B1 | 11/2017 | Gomez et al. |
| 9,825,989 B1 | 11/2017 | Mehra et al. |
| 9,838,408 B1 | 12/2017 | Karandikar et al. |
| 9,838,411 B1 | 12/2017 | Aziz |
| 9,838,416 B1 | 12/2017 | Aziz |
| 9,838,417 B1 | 12/2017 | Khalid et al. |
| 9,846,776 B1 | 12/2017 | Paithane et al. |
| 9,876,701 B1 | 1/2018 | Caldejon et al. |
| 9,888,016 B1 | 2/2018 | Amin et al. |

(56) References Cited

U.S. PATENT DOCUMENTS

| | | |
|---|---|---|
| 9,888,019 B1 | 2/2018 | Pidathala et al. |
| 9,910,988 B1 | 3/2018 | Vincent et al. |
| 9,912,644 B2 | 3/2018 | Cunningham |
| 9,912,681 B1 | 3/2018 | Ismael et al. |
| 9,912,684 B1 | 3/2018 | Aziz et al. |
| 9,912,691 B2 | 3/2018 | Mesdaq et al. |
| 9,912,698 B1 | 3/2018 | Thioux et al. |
| 9,916,440 B1 | 3/2018 | Paithane et al. |
| 9,921,978 B1 | 3/2018 | Chan et al. |
| 9,934,376 B1 | 4/2018 | Ismael |
| 9,934,381 B1 | 4/2018 | Kindlund et al. |
| 9,946,568 B1 | 4/2018 | Ismael et al. |
| 9,954,890 B1 | 4/2018 | Staniford et al. |
| 9,973,531 B1 | 5/2018 | Thioux |
| 9,985,980 B1 * | 5/2018 | Kolman ............ H04L 63/1416 |
| 9,985,982 B1 * | 5/2018 | Bartos ............... H04L 63/1425 |
| 10,002,252 B2 | 6/2018 | Ismael et al. |
| 10,009,374 B1 * | 6/2018 | Jing .................. H04L 63/1466 |
| 10,019,338 B1 | 7/2018 | Goradia et al. |
| 10,019,573 B2 | 7/2018 | Silberman et al. |
| 10,025,691 B1 | 7/2018 | Ismael et al. |
| 10,025,927 B1 | 7/2018 | Khalid et al. |
| 10,027,689 B1 | 7/2018 | Rathor et al. |
| 10,027,690 B2 | 7/2018 | Aziz et al. |
| 10,027,696 B1 | 7/2018 | Rivlin et al. |
| 10,033,747 B1 | 7/2018 | Paithane et al. |
| 10,033,748 B1 | 7/2018 | Cunningham et al. |
| 10,033,753 B1 | 7/2018 | Islam et al. |
| 10,033,759 B1 | 7/2018 | Kabra et al. |
| 10,050,998 B1 | 8/2018 | Singh |
| 10,068,091 B1 | 9/2018 | Aziz et al. |
| 10,075,455 B2 | 9/2018 | Zafar et al. |
| 10,083,302 B1 | 9/2018 | Paithane et al. |
| 10,084,813 B2 | 9/2018 | Eyada |
| 10,089,461 B1 | 10/2018 | Ha et al. |
| 10,097,573 B1 | 10/2018 | Aziz |
| 10,104,101 B1 * | 10/2018 | Thakar .................... G06F 21/56 |
| 10,104,102 B1 | 10/2018 | Neumann |
| 10,108,446 B1 | 10/2018 | Steinberg et al. |
| 10,121,000 B1 | 11/2018 | Rivlin et al. |
| 10,122,746 B1 | 11/2018 | Manni et al. |
| 10,133,863 B2 | 11/2018 | Bu et al. |
| 10,133,866 B1 | 11/2018 | Kumar et al. |
| 10,146,810 B2 | 12/2018 | Shiffer et al. |
| 10,148,693 B2 | 12/2018 | Singh et al. |
| 10,165,000 B1 | 12/2018 | Aziz et al. |
| 10,169,585 B1 | 1/2019 | Pilipenko et al. |
| 10,176,321 B2 | 1/2019 | Abbasi et al. |
| 10,181,029 B1 | 1/2019 | Ismael et al. |
| 10,191,861 B1 | 1/2019 | Steinberg et al. |
| 10,192,052 B1 | 1/2019 | Singh et al. |
| 10,198,574 B1 | 2/2019 | Thioux et al. |
| 10,200,384 B1 | 2/2019 | Mushtaq et al. |
| 10,210,329 B1 | 2/2019 | Malik et al. |
| 10,216,927 B1 | 2/2019 | Steinberg |
| 10,218,740 B1 | 2/2019 | Mesdaq et al. |
| 10,237,287 B1 * | 3/2019 | Amidon ............ H04L 63/1433 |
| 10,242,185 B1 | 3/2019 | Goradia |
| 10,419,931 B1 * | 9/2019 | Sohail ................ H04L 63/0823 |
| 10,601,848 B1 * | 3/2020 | Jeyaraman ............ H04L 63/145 |
| 2001/0005889 A1 | 6/2001 | Albrecht |
| 2001/0047326 A1 | 11/2001 | Broadbent et al. |
| 2002/0018903 A1 | 2/2002 | Kokubo et al. |
| 2002/0038430 A1 | 3/2002 | Edwards et al. |
| 2002/0091819 A1 | 7/2002 | Melchione et al. |
| 2002/0095607 A1 | 7/2002 | Lin-Hendel |
| 2002/0116627 A1 | 8/2002 | Tarbotton et al. |
| 2002/0144156 A1 | 10/2002 | Copeland |
| 2002/0162015 A1 | 10/2002 | Tang |
| 2002/0166063 A1 | 11/2002 | Lachman et al. |
| 2002/0169952 A1 | 11/2002 | DiSanto et al. |
| 2002/0184528 A1 | 12/2002 | Shevenell et al. |
| 2002/0188887 A1 | 12/2002 | Largman et al. |
| 2002/0194490 A1 | 12/2002 | Halperin et al. |
| 2003/0021728 A1 | 1/2003 | Sharpe et al. |
| 2003/0074578 A1 | 4/2003 | Ford et al. |
| 2003/0084318 A1 | 5/2003 | Schertz |
| 2003/0101381 A1 | 5/2003 | Mateev et al. |
| 2003/0115483 A1 | 6/2003 | Liang |
| 2003/0188190 A1 | 10/2003 | Aaron et al. |
| 2003/0191957 A1 | 10/2003 | Hypponen et al. |
| 2003/0200460 A1 | 10/2003 | Morota et al. |
| 2003/0212902 A1 | 11/2003 | van der Made |
| 2003/0229801 A1 | 12/2003 | Kouznetsov et al. |
| 2003/0237000 A1 | 12/2003 | Denton et al. |
| 2004/0003323 A1 | 1/2004 | Bennett et al. |
| 2004/0006473 A1 | 1/2004 | Mills et al. |
| 2004/0015712 A1 | 1/2004 | Szor |
| 2004/0019832 A1 | 1/2004 | Arnold et al. |
| 2004/0047356 A1 | 3/2004 | Bauer |
| 2004/0083408 A1 | 4/2004 | Spiegel et al. |
| 2004/0088581 A1 | 5/2004 | Brawn et al. |
| 2004/0093513 A1 | 5/2004 | Cantrell et al. |
| 2004/0111531 A1 | 6/2004 | Staniford et al. |
| 2004/0117478 A1 | 6/2004 | Triulzi et al. |
| 2004/0117624 A1 | 6/2004 | Brandt et al. |
| 2004/0128355 A1 | 7/2004 | Chao et al. |
| 2004/0165588 A1 | 8/2004 | Pandya |
| 2004/0236963 A1 | 11/2004 | Danford et al. |
| 2004/0243349 A1 | 12/2004 | Greifeneder et al. |
| 2004/0249911 A1 | 12/2004 | Alkhatib et al. |
| 2004/0255161 A1 | 12/2004 | Cavanaugh |
| 2004/0268147 A1 | 12/2004 | Wiederin et al. |
| 2005/0005159 A1 | 1/2005 | Oliphant |
| 2005/0021740 A1 | 1/2005 | Bar et al. |
| 2005/0033960 A1 | 2/2005 | Vialen et al. |
| 2005/0033989 A1 | 2/2005 | Poletto et al. |
| 2005/0050148 A1 | 3/2005 | Mohammadioun et al. |
| 2005/0086523 A1 | 4/2005 | Zimmer et al. |
| 2005/0091513 A1 | 4/2005 | Mitomo et al. |
| 2005/0091533 A1 | 4/2005 | Omote et al. |
| 2005/0091652 A1 | 4/2005 | Ross et al. |
| 2005/0097339 A1 * | 5/2005 | Wiley ................... G06F 21/554 |
| | | 713/188 |
| 2005/0108562 A1 | 5/2005 | Khazan et al. |
| 2005/0114663 A1 | 5/2005 | Cornell et al. |
| 2005/0125195 A1 | 6/2005 | Brendel |
| 2005/0149726 A1 | 7/2005 | Joshi et al. |
| 2005/0157662 A1 | 7/2005 | Bingham et al. |
| 2005/0183143 A1 | 8/2005 | Anderholm et al. |
| 2005/0201297 A1 | 9/2005 | Peikari |
| 2005/0210533 A1 | 9/2005 | Copeland et al. |
| 2005/0238005 A1 | 10/2005 | Chen et al. |
| 2005/0240781 A1 | 10/2005 | Gassoway |
| 2005/0262562 A1 | 11/2005 | Gassoway |
| 2005/0265331 A1 | 12/2005 | Stolfo |
| 2005/0283839 A1 | 12/2005 | Cowburn |
| 2006/0010495 A1 | 1/2006 | Cohen et al. |
| 2006/0015416 A1 | 1/2006 | Hoffman et al. |
| 2006/0015715 A1 | 1/2006 | Anderson |
| 2006/0015747 A1 | 1/2006 | Van de Ven |
| 2006/0018466 A1 * | 1/2006 | Adelstein ............ H04L 63/1425 |
| | | 380/46 |
| 2006/0021029 A1 | 1/2006 | Brickell et al. |
| 2006/0021054 A1 | 1/2006 | Costa et al. |
| 2006/0031476 A1 | 2/2006 | Mathes et al. |
| 2006/0047665 A1 | 3/2006 | Neil |
| 2006/0070130 A1 | 3/2006 | Costea et al. |
| 2006/0075490 A1 * | 4/2006 | Boney ................... G06F 21/566 |
| | | 726/22 |
| 2006/0075496 A1 | 4/2006 | Carpenter et al. |
| 2006/0095968 A1 | 5/2006 | Portolani et al. |
| 2006/0101516 A1 | 5/2006 | Sudaharan et al. |
| 2006/0101517 A1 | 5/2006 | Banzhof et al. |
| 2006/0117385 A1 | 6/2006 | Mester et al. |
| 2006/0123477 A1 | 6/2006 | Raghavan et al. |
| 2006/0143709 A1 | 6/2006 | Brooks et al. |
| 2006/0150249 A1 | 7/2006 | Gassen et al. |
| 2006/0161983 A1 | 7/2006 | Cothrell et al. |
| 2006/0161987 A1 | 7/2006 | Levy-Yurista |
| 2006/0161989 A1 | 7/2006 | Reshef et al. |
| 2006/0164199 A1 | 7/2006 | Gilde et al. |
| 2006/0173992 A1 | 8/2006 | Weber et al. |
| 2006/0179147 A1 | 8/2006 | Tran et al. |

(56) References Cited

U.S. PATENT DOCUMENTS

| | | |
|---|---|---|
| 2006/0184632 A1 | 8/2006 | Marino et al. |
| 2006/0191010 A1 | 8/2006 | Benjamin |
| 2006/0221956 A1 | 10/2006 | Narayan et al. |
| 2006/0236393 A1 | 10/2006 | Kramer et al. |
| 2006/0242709 A1 | 10/2006 | Seinfeld et al. |
| 2006/0248519 A1 | 11/2006 | Jaeger et al. |
| 2006/0248582 A1 | 11/2006 | Panjwani et al. |
| 2006/0251104 A1 | 11/2006 | Koga |
| 2006/0288417 A1 | 12/2006 | Bookbinder et al. |
| 2007/0006288 A1 | 1/2007 | Mayfield et al. |
| 2007/0006313 A1 | 1/2007 | Porras et al. |
| 2007/0011174 A1 | 1/2007 | Takaragi et al. |
| 2007/0016951 A1 | 1/2007 | Piccard et al. |
| 2007/0019286 A1 | 1/2007 | Kikuchi |
| 2007/0033645 A1 | 2/2007 | Jones |
| 2007/0038943 A1 | 2/2007 | FitzGerald et al. |
| 2007/0064689 A1 | 3/2007 | Shin et al. |
| 2007/0074169 A1 | 3/2007 | Chess et al. |
| 2007/0094730 A1 | 4/2007 | Bhikkaji et al. |
| 2007/0101435 A1 | 5/2007 | Konanka et al. |
| 2007/0128855 A1 | 6/2007 | Cho et al. |
| 2007/0142030 A1 | 6/2007 | Sinha et al. |
| 2007/0143827 A1 | 6/2007 | Nicodemus et al. |
| 2007/0156895 A1 | 7/2007 | Vuong |
| 2007/0157180 A1 | 7/2007 | Tillmann et al. |
| 2007/0157306 A1 | 7/2007 | Elrod et al. |
| 2007/0168988 A1 | 7/2007 | Eisner et al. |
| 2007/0171824 A1 | 7/2007 | Ruello et al. |
| 2007/0174915 A1 | 7/2007 | Gribble et al. |
| 2007/0192500 A1 | 8/2007 | Lum |
| 2007/0192858 A1 | 8/2007 | Lum |
| 2007/0198275 A1 | 8/2007 | Malden et al. |
| 2007/0208822 A1 | 9/2007 | Wang et al. |
| 2007/0220607 A1 | 9/2007 | Sprosts et al. |
| 2007/0240218 A1 | 10/2007 | Tuvell et al. |
| 2007/0240219 A1 | 10/2007 | Tuvell et al. |
| 2007/0240220 A1 | 10/2007 | Tuvell et al. |
| 2007/0240222 A1 | 10/2007 | Tuvell et al. |
| 2007/0250930 A1 | 10/2007 | Aziz et al. |
| 2007/0256132 A2 | 11/2007 | Oliphant |
| 2007/0271446 A1 | 11/2007 | Nakamura |
| 2008/0005782 A1 | 1/2008 | Aziz |
| 2008/0018122 A1 | 1/2008 | Zierler et al. |
| 2008/0028463 A1 | 1/2008 | Dagon et al. |
| 2008/0040710 A1 | 2/2008 | Chiriac |
| 2008/0046781 A1 | 2/2008 | Childs et al. |
| 2008/0066179 A1 | 3/2008 | Liu |
| 2008/0072326 A1 | 3/2008 | Danford et al. |
| 2008/0077793 A1 | 3/2008 | Tan et al. |
| 2008/0080518 A1 | 4/2008 | Hoeflin et al. |
| 2008/0086720 A1 | 4/2008 | Lekel |
| 2008/0098476 A1 | 4/2008 | Syversen |
| 2008/0120722 A1 | 5/2008 | Sima et al. |
| 2008/0134178 A1 | 6/2008 | Fitzgerald et al. |
| 2008/0134334 A1 | 6/2008 | Kim et al. |
| 2008/0141376 A1 | 6/2008 | Clausen et al. |
| 2008/0184367 A1 | 7/2008 | McMillan et al. |
| 2008/0184373 A1 | 7/2008 | Traut et al. |
| 2008/0189787 A1 | 8/2008 | Arnold et al. |
| 2008/0201778 A1 | 8/2008 | Guo et al. |
| 2008/0209557 A1 | 8/2008 | Herley et al. |
| 2008/0215742 A1 | 9/2008 | Goldszmidt et al. |
| 2008/0222729 A1 | 9/2008 | Chen et al. |
| 2008/0263665 A1 | 10/2008 | Ma et al. |
| 2008/0295172 A1 | 11/2008 | Bohacek |
| 2008/0301810 A1 | 12/2008 | Lehane et al. |
| 2008/0307524 A1 | 12/2008 | Singh et al. |
| 2008/0313738 A1 | 12/2008 | Enderby |
| 2008/0320594 A1 | 12/2008 | Jiang |
| 2009/0003317 A1 | 1/2009 | Kasralikar et al. |
| 2009/0007100 A1 | 1/2009 | Field et al. |
| 2009/0013408 A1 | 1/2009 | Schipka |
| 2009/0031423 A1 | 1/2009 | Liu et al. |
| 2009/0036111 A1 | 2/2009 | Danford et al. |
| 2009/0037835 A1 | 2/2009 | Goldman |
| 2009/0044024 A1 | 2/2009 | Oberheide et al. |
| 2009/0044274 A1 | 2/2009 | Budko et al. |
| 2009/0064332 A1 | 3/2009 | Porras et al. |
| 2009/0077666 A1 | 3/2009 | Chen et al. |
| 2009/0083369 A1 | 3/2009 | Marmor |
| 2009/0083855 A1 | 3/2009 | Apap et al. |
| 2009/0089879 A1 | 4/2009 | Wang et al. |
| 2009/0094697 A1 | 4/2009 | Provos et al. |
| 2009/0113425 A1 | 4/2009 | Ports et al. |
| 2009/0125976 A1 | 5/2009 | Wassermann et al. |
| 2009/0126015 A1 | 5/2009 | Monastyrsky et al. |
| 2009/0126016 A1 | 5/2009 | Sobko et al. |
| 2009/0126019 A1* | 5/2009 | Memon .................. G06F 21/552 726/23 |
| 2009/0133125 A1 | 5/2009 | Choi et al. |
| 2009/0144823 A1 | 6/2009 | Lamastra et al. |
| 2009/0158430 A1 | 6/2009 | Borders |
| 2009/0172815 A1 | 7/2009 | Gu et al. |
| 2009/0187992 A1 | 7/2009 | Poston |
| 2009/0193293 A1 | 7/2009 | Stolfo et al. |
| 2009/0198651 A1 | 8/2009 | Shiffer et al. |
| 2009/0198670 A1 | 8/2009 | Shiffer et al. |
| 2009/0198689 A1 | 8/2009 | Frazier et al. |
| 2009/0199274 A1 | 8/2009 | Frazier et al. |
| 2009/0199296 A1 | 8/2009 | Xie et al. |
| 2009/0228233 A1 | 9/2009 | Anderson et al. |
| 2009/0241187 A1 | 9/2009 | Troyansky |
| 2009/0241190 A1 | 9/2009 | Todd et al. |
| 2009/0265692 A1 | 10/2009 | Godefroid et al. |
| 2009/0271867 A1 | 10/2009 | Zhang |
| 2009/0300415 A1 | 12/2009 | Zhang et al. |
| 2009/0300761 A1 | 12/2009 | Park et al. |
| 2009/0328185 A1 | 12/2009 | Berg et al. |
| 2009/0328221 A1 | 12/2009 | Blumfield et al. |
| 2010/0005146 A1 | 1/2010 | Drako et al. |
| 2010/0011205 A1 | 1/2010 | McKenna |
| 2010/0017546 A1 | 1/2010 | Poo et al. |
| 2010/0030996 A1 | 2/2010 | Butler, II |
| 2010/0031353 A1 | 2/2010 | Thomas et al. |
| 2010/0037314 A1 | 2/2010 | Perdisci et al. |
| 2010/0043073 A1 | 2/2010 | Kuwamura |
| 2010/0054278 A1 | 3/2010 | Stolfo et al. |
| 2010/0058474 A1 | 3/2010 | Hicks |
| 2010/0064044 A1 | 3/2010 | Nonoyama |
| 2010/0077481 A1 | 3/2010 | Polyakov et al. |
| 2010/0083376 A1 | 4/2010 | Pereira et al. |
| 2010/0115621 A1 | 5/2010 | Staniford et al. |
| 2010/0132038 A1 | 5/2010 | Zaitsev |
| 2010/0154056 A1 | 6/2010 | Smith et al. |
| 2010/0180344 A1 | 7/2010 | Malyshev et al. |
| 2010/0192223 A1 | 7/2010 | Ismael et al. |
| 2010/0220863 A1 | 9/2010 | Dupaquis et al. |
| 2010/0235831 A1 | 9/2010 | Dittmer |
| 2010/0251104 A1 | 9/2010 | Massand |
| 2010/0281102 A1 | 11/2010 | Chinta et al. |
| 2010/0281541 A1 | 11/2010 | Stolfo et al. |
| 2010/0281542 A1 | 11/2010 | Stolfo et al. |
| 2010/0287260 A1 | 11/2010 | Peterson et al. |
| 2010/0299754 A1 | 11/2010 | Amit et al. |
| 2010/0306173 A1 | 12/2010 | Frank |
| 2011/0004737 A1 | 1/2011 | Greenebaum |
| 2011/0025504 A1 | 2/2011 | Lyon et al. |
| 2011/0041179 A1 | 2/2011 | St Hlberg |
| 2011/0047594 A1 | 2/2011 | Mahaffey et al. |
| 2011/0047620 A1 | 2/2011 | Mahaffey et al. |
| 2011/0055907 A1 | 3/2011 | Narasimhan et al. |
| 2011/0078794 A1 | 3/2011 | Manni et al. |
| 2011/0093951 A1 | 4/2011 | Aziz |
| 2011/0099620 A1 | 4/2011 | Stavrou et al. |
| 2011/0099633 A1 | 4/2011 | Aziz |
| 2011/0099635 A1 | 4/2011 | Silberman et al. |
| 2011/0113231 A1 | 5/2011 | Kaminsky |
| 2011/0145918 A1 | 6/2011 | Jung et al. |
| 2011/0145920 A1 | 6/2011 | Mahaffey et al. |
| 2011/0145934 A1 | 6/2011 | Abramovici et al. |
| 2011/0167493 A1 | 7/2011 | Song et al. |
| 2011/0167494 A1 | 7/2011 | Bowen et al. |
| 2011/0173213 A1 | 7/2011 | Frazier et al. |
| 2011/0173460 A1 | 7/2011 | Ito et al. |

(56) References Cited

U.S. PATENT DOCUMENTS

| | | |
|---|---|---|
| 2011/0219449 A1 | 9/2011 | St. Neitzel et al. |
| 2011/0219450 A1 | 9/2011 | McDougal et al. |
| 2011/0225624 A1 | 9/2011 | Sawhney et al. |
| 2011/0225655 A1 | 9/2011 | Niemela et al. |
| 2011/0247072 A1 | 10/2011 | Staniford et al. |
| 2011/0265182 A1 | 10/2011 | Peinado et al. |
| 2011/0289582 A1 | 11/2011 | Kejriwal et al. |
| 2011/0302587 A1 | 12/2011 | Nishikawa et al. |
| 2011/0307954 A1 | 12/2011 | Melnik et al. |
| 2011/0307955 A1 | 12/2011 | Kaplan et al. |
| 2011/0307956 A1 | 12/2011 | Yermakov et al. |
| 2011/0314546 A1 | 12/2011 | Aziz et al. |
| 2012/0023593 A1 | 1/2012 | Puder et al. |
| 2012/0054869 A1 | 3/2012 | Yen et al. |
| 2012/0066698 A1 | 3/2012 | Yanoo |
| 2012/0079596 A1 | 3/2012 | Thomas et al. |
| 2012/0084859 A1 | 4/2012 | Radinsky et al. |
| 2012/0096553 A1 | 4/2012 | Srivastava et al. |
| 2012/0110667 A1 | 5/2012 | Zubrilin et al. |
| 2012/0117652 A1 | 5/2012 | Manni et al. |
| 2012/0121154 A1 | 5/2012 | Xue et al. |
| 2012/0124426 A1 | 5/2012 | Maybee et al. |
| 2012/0151033 A1* | 6/2012 | Baliga .............. H04L 63/1425 709/224 |
| 2012/0174186 A1 | 7/2012 | Aziz et al. |
| 2012/0174196 A1 | 7/2012 | Bhogavilli et al. |
| 2012/0174218 A1 | 7/2012 | McCoy et al. |
| 2012/0198279 A1 | 8/2012 | Schroeder |
| 2012/0210423 A1 | 8/2012 | Friedrichs et al. |
| 2012/0222121 A1 | 8/2012 | Staniford et al. |
| 2012/0255015 A1 | 10/2012 | Sahita et al. |
| 2012/0255017 A1 | 10/2012 | Sallam |
| 2012/0260342 A1 | 10/2012 | Dube et al. |
| 2012/0266244 A1 | 10/2012 | Green et al. |
| 2012/0278886 A1 | 11/2012 | Luna |
| 2012/0297489 A1 | 11/2012 | Dequevy |
| 2012/0330801 A1 | 12/2012 | McDougal et al. |
| 2012/0331553 A1 | 12/2012 | Aziz et al. |
| 2013/0014259 A1 | 1/2013 | Gribble et al. |
| 2013/0036472 A1 | 2/2013 | Aziz |
| 2013/0047257 A1 | 2/2013 | Aziz |
| 2013/0074185 A1 | 3/2013 | McDougal et al. |
| 2013/0086684 A1 | 4/2013 | Mohler |
| 2013/0097699 A1 | 4/2013 | Balupari et al. |
| 2013/0097706 A1 | 4/2013 | Titonis et al. |
| 2013/0111587 A1 | 5/2013 | Goel et al. |
| 2013/0117852 A1 | 5/2013 | Stute |
| 2013/0117855 A1 | 5/2013 | Kim et al. |
| 2013/0139264 A1 | 5/2013 | Brinkley et al. |
| 2013/0160125 A1 | 6/2013 | Likhachev et al. |
| 2013/0160127 A1 | 6/2013 | Jeong et al. |
| 2013/0160130 A1 | 6/2013 | Mendelev et al. |
| 2013/0160131 A1 | 6/2013 | Madou et al. |
| 2013/0167236 A1 | 6/2013 | Sick |
| 2013/0174214 A1 | 7/2013 | Duncan |
| 2013/0185789 A1 | 7/2013 | Hagiwara et al. |
| 2013/0185795 A1 | 7/2013 | Winn et al. |
| 2013/0185798 A1 | 7/2013 | Saunders et al. |
| 2013/0191915 A1 | 7/2013 | Antonakakis et al. |
| 2013/0196649 A1 | 8/2013 | Paddon et al. |
| 2013/0227691 A1 | 8/2013 | Aziz et al. |
| 2013/0246370 A1 | 9/2013 | Bartram et al. |
| 2013/0247186 A1 | 9/2013 | LeMasters |
| 2013/0263260 A1 | 10/2013 | Mahaffey et al. |
| 2013/0291109 A1 | 10/2013 | Staniford et al. |
| 2013/0298243 A1 | 11/2013 | Kumar et al. |
| 2013/0318038 A1 | 11/2013 | Shiffer et al. |
| 2013/0318073 A1 | 11/2013 | Shiffer et al. |
| 2013/0325791 A1 | 12/2013 | Shiffer et al. |
| 2013/0325792 A1 | 12/2013 | Shiffer et al. |
| 2013/0325871 A1 | 12/2013 | Shiffer et al. |
| 2013/0325872 A1 | 12/2013 | Shiffer et al. |
| 2014/0032875 A1 | 1/2014 | Butler |
| 2014/0053260 A1 | 2/2014 | Gupta et al. |
| 2014/0053261 A1 | 2/2014 | Gupta et al. |
| 2014/0082730 A1* | 3/2014 | Vashist .............. H04L 63/1416 726/23 |
| 2014/0130158 A1 | 5/2014 | Wang et al. |
| 2014/0137180 A1 | 5/2014 | Lukacs et al. |
| 2014/0169762 A1 | 6/2014 | Ryu |
| 2014/0179360 A1 | 6/2014 | Jackson et al. |
| 2014/0181131 A1 | 6/2014 | Ross |
| 2014/0189687 A1 | 7/2014 | Jung et al. |
| 2014/0189866 A1 | 7/2014 | Shiffer et al. |
| 2014/0189882 A1 | 7/2014 | Jung et al. |
| 2014/0230060 A1* | 8/2014 | Higbee .............. H04L 63/1425 726/24 |
| 2014/0230061 A1* | 8/2014 | Higbee .............. H04L 63/1416 726/24 |
| 2014/0237600 A1 | 8/2014 | Silberman et al. |
| 2014/0280245 A1 | 9/2014 | Wilson |
| 2014/0283037 A1 | 9/2014 | Sikorski et al. |
| 2014/0283063 A1 | 9/2014 | Thompson et al. |
| 2014/0328204 A1 | 11/2014 | Klotsche et al. |
| 2014/0337836 A1 | 11/2014 | Ismael |
| 2014/0344926 A1 | 11/2014 | Cunningham et al. |
| 2014/0351935 A1 | 11/2014 | Shao et al. |
| 2014/0373143 A1* | 12/2014 | Chesla .............. H04L 63/1458 726/22 |
| 2014/0380473 A1 | 12/2014 | Bu et al. |
| 2014/0380474 A1 | 12/2014 | Paithane et al. |
| 2015/0007312 A1 | 1/2015 | Pidathala et al. |
| 2015/0096022 A1 | 4/2015 | Vincent et al. |
| 2015/0096023 A1 | 4/2015 | Mesdaq et al. |
| 2015/0096024 A1 | 4/2015 | Haq et al. |
| 2015/0096025 A1 | 4/2015 | Ismael |
| 2015/0180886 A1 | 6/2015 | Staniford et al. |
| 2015/0180890 A1* | 6/2015 | Ronen .............. H04L 63/1416 726/23 |
| 2015/0186645 A1 | 7/2015 | Aziz et al. |
| 2015/0199513 A1 | 7/2015 | Ismael et al. |
| 2015/0199531 A1 | 7/2015 | Ismael et al. |
| 2015/0199532 A1 | 7/2015 | Ismael et al. |
| 2015/0220735 A1 | 8/2015 | Paithane et al. |
| 2015/0365427 A1* | 12/2015 | Ben-Shalom ....... H04L 63/1416 726/23 |
| 2015/0372980 A1 | 12/2015 | Eyada |
| 2016/0004869 A1 | 1/2016 | Ismael et al. |
| 2016/0006756 A1 | 1/2016 | Ismael et al. |
| 2016/0020969 A1* | 1/2016 | Vasseur .............. H04L 43/062 370/252 |
| 2016/0044000 A1 | 2/2016 | Cunningham |
| 2016/0094569 A1* | 3/2016 | Mondiguing ....... H04L 63/1416 726/24 |
| 2016/0127393 A1 | 5/2016 | Aziz et al. |
| 2016/0191547 A1 | 6/2016 | Zafar et al. |
| 2016/0191550 A1 | 6/2016 | Ismael et al. |
| 2016/0261612 A1 | 9/2016 | Mesdaq et al. |
| 2016/0285914 A1 | 9/2016 | Singh et al. |
| 2016/0301703 A1 | 10/2016 | Aziz |
| 2016/0335110 A1 | 11/2016 | Paithane et al. |
| 2016/0359740 A1* | 12/2016 | Parandehgheibi .. G06F 16/2322 |
| 2017/0034205 A1* | 2/2017 | Canedo .............. H04L 63/1416 |
| 2017/0083703 A1 | 3/2017 | Abbasi et al. |
| 2017/0142145 A1* | 5/2017 | Bu er .............. H04L 63/1416 |
| 2017/0171231 A1* | 6/2017 | Reybok, Jr. .......... H04L 63/14 |
| 2017/0187730 A1* | 6/2017 | Singla .............. H04L 63/1416 |
| 2017/0223043 A1* | 8/2017 | Munoz .............. H04L 63/1483 |
| 2018/0013770 A1 | 1/2018 | Ismael |
| 2018/0013788 A1* | 1/2018 | Vissamsetty ........ H04L 63/1466 |
| 2018/0048660 A1 | 2/2018 | Paithane et al. |
| 2018/0121316 A1 | 5/2018 | Ismael et al. |
| 2018/0241761 A1 | 8/2018 | Bania et al. |
| 2018/0248894 A1* | 8/2018 | Greeter .............. G06F 21/50 |
| 2018/0288077 A1 | 10/2018 | Siddiqui et al. |
| 2018/0295149 A1* | 10/2018 | Gazit .............. H04L 63/1441 |
| 2018/0375884 A1* | 12/2018 | Kopp .............. H04L 63/1425 |

FOREIGN PATENT DOCUMENTS

| | | |
|---|---|---|
| GB | 2490431 A | 10/2012 |
| WO | 02/06928 A2 | 1/2002 |
| WO | 02/23805 A2 | 3/2002 |

(56) References Cited

FOREIGN PATENT DOCUMENTS

| WO | 2007-117636 A2 | 10/2007 |
|---|---|---|
| WO | 2008/041950 A2 | 4/2008 |
| WO | 2011/084431 A2 | 7/2011 |
| WO | 2011/112348 A1 | 9/2011 |
| WO | 2012/075336 A1 | 6/2012 |
| WO | 2012/145066 A1 | 10/2012 |
| WO | 2013/067505 A1 | 5/2013 |
| WO | 2015/047802 A2 | 4/2015 |
| WO | 2015/200360 A1 | 12/2015 |

OTHER PUBLICATIONS

Hiroshi Shinotsuka, Malware Authors Using New Techniques to Evade Automated Threat Analysis Systems, Oct. 26, 2012, http://www.symantec.com/connect/blogs/, pp. 1-4.
Khaled Salah et al: "Using Cloud Computing to Implement a Security Overlay Network", Security & Privacy, IEEE, IEEE Service Center, Los Alamitos, CA, US, vol. 11, No. 1, Jan. 1, 2013 (Jan. 1, 2013).
Lastline Labs, The Threat of Evasive Malware, Feb. 25, 2013, Lastline Labs, pp. 1-8.
U.S. Appl. No. 15/638,262, filed Jun. 29, 2017 Non-Final Office Action dated May 31, 2019.
Vladimir Getov: "Security as a Service in Smart Clouds— Opportunities and Concerns", Computer Software and Applications Conference (COMPSAC), 2012 IEEE 36th Annual, IEEE, Jul. 16, 2012 (Jul. 16, 2012).
PCT/US2018/040470 filed Jun. 29, 2018 International Search Report and Written Opinion dated Sep. 14, 2018.
"Mining Specification of Malicious Behavior"—Jha et al, UCSB, Sep. 2007 https://www.cs.ucsb.edu/.about.chris/research/doc/esec07.sub.--mining.pdf-.
"Network Security: NetDetector—Network Intrusion Forensic System (NIFS) Whitepaper", ("NetDetector Whitepaper"), (2003).
"When Virtual is Better Than Real", IEEEXplore Digital Library, available at, http://ieeexplore.ieee.org/xpl/articleDetails.isp?reload=true&arnumbe- r=990073, (Dec. 7, 2013).
Abdullah, et al., Visualizing Network Data for Intrusion Detection, 2005 IEEE Workshop on Information Assurance and Security, pp. 100-108.
Adetoye, Adedayo, et al., "Network Intrusion Detection & Response System", ("Adetoye"), (Sep. 2003).
Apostolopoulos, George; hassapis, Constantinos; "V-eM: A cluster of Virtual Machines for Robust, Detailed, and High-Performance Network Emulation", 14th IEEE International Symposium on Modeling, Analysis, and Simulation of Computer and Telecommunication Systems, Sep. 11-14, 2006, pp. 117-126.
Aura, Tuomas, "Scanning electronic documents for personally identifiable information", Proceedings of the 5th ACM workshop on Privacy in electronic society. ACM, 2006.
Baecher, "The Nepenthes Platform: An Efficient Approach to collect Malware", Springer-verlag Berlin Heidelberg, (2006), pp. 165-184.
Baldi, Mario; Risso, Fulvio; "A Framework for Rapid Development and Portable Execution of Packet-Handling Applications", 5th IEEE International Symposium Processing and Information Technology, Dec. 21, 2005, pp. 233-238.
Bayer, et al., "Dynamic Analysis of Malicious Code", J Comput Virol, Springer-Verlag, France., (2006), pp. 67-77.
Boubalos, Chris, "extracting syslog data out of raw pcap dumps, seclists.org, Honeypots mailing list archives", available at http://seclists.org/honeypots/2003/q2/319 ("Boubalos"), (Jun. 5, 2003).
Chaudet, C., et al., "Optimal Positioning of Active and Passive Monitoring Devices", International Conference on Emerging Networking Experiments and Technologies, Proceedings of the 2005 ACM Conference on Emerging Network Experiment and Technology, CoNEXT '05, Toulousse, France, (Oct. 2005), pp. 71-82.
Chen, P. M. and Noble, B. D., "When Virtual is Better Than Real, Department of Electrical Engineering and Computer Science", University of Michigan ("Chen") (2001).

Cisco "Intrusion Prevention for the Cisco ASA 5500-x Series" Data Sheet (2012).
Cisco, Configuring the Catalyst Switched Port Analyzer (SPAN) ("Cisco"), (1992).
Clark, John, Sylvian Leblanc,and Scott Knight. "Risks associated with usb hardware trojan devices used by insiders." Systems Conference (SysCon), 2011 IEEE International. IEEE, 2011.
Cohen, M.I., "PyFlag—An advanced network forensic framework", Digital investigation 5, Elsevier, (2008), pp. S112-S120.
Costa, M., et al., "Vigilante: End-to-End Containment of Internet Worms", SOSP '05, Association for Computing Machinery, Inc., Brighton U.K., (Oct. 23-26, 2005).
Crandall, J.R., et al., "Minos:Control Data Attack Prevention Orthogonal to Memory Model", 37th International Symposium on Microarchitecture, Portland, Oregon, (Dec. 2004).
Cyrus, R. "Detecting Malicious SMB Activity Using Bro" The SANS Institute, Dec. 13, 2016.
Deutsch, P., "Zlib compressed data format specification version 13" RFC 1950, (1996).
Distler, "Malware Analysis: An Introduction", SANS Institute InfoSec Reading Room, SANS Institute, (2007).
Dunlap, George W., et al., "ReVirt: Enabling Intrusion Analysis through Virtual-Machine Logging and Replay", Proceeding of the 5th Symposium on Operating Systems Design and Implementation, USENIX Association, ("Dunlap"), (Dec. 9, 2002).
Excerpt regarding First Printing Date for Merike Kaeo, Designing Network Security ("Kaeo"), (2005).
Filiol, Eric, et al., "Combinatorial Optimisation of Worm Propagation on an Unknown Network", International Journal of Computer Science 2.2 (2007).
FireEye Malware Analysis & Exchange Network, Malware Protection System, FireEye Inc., 2010.
FireEye Malware Analysis, Modern Malware Forensics, FireEye Inc., 2010.
FireEye v.6.0 Security Target, pp. 1-35, Version 1.1, FireEye Inc., May 2011.
Gibler, Clint, et al. AndroidLeaks: automatically detecting potential privacy leaks in android applications on a large scale. Springer Berlin Heidelberg, 2012.
Goel, et al., Reconstructing System State for Intrusion Analysis, Apr. 2008 SIGOPS Operating Systems Review, vol. 42 Issue 3, pp. 21-28.
Gregg Keizer: "Microsoft's HoneyMonkeys Show Patching Windows Works", Aug. 8, 2005, XP055143386, Retrieved from the Internet: URL:http://www.informationweek.com/microsofts-honeymonkeys-show-patching-windows-works/d/d-id/1035069? [retrieved on Jun. 1, 2016].
Heng Yin et al, Panorama: Capturing System-Wide Information Flow for Malware Detection and Analysis, Research Showcase © CMU, Carnegie Mellon University, 2007.
Hjelmvik, Erik, "Passive Network Security Analysis with NetworkMiner", (IN)Secure, Issue 18, (Oct. 2008), pp. 1-100.
Idika et al., A-Survey-of-Malware-Detection-Techniques, Feb. 2, 2007, Department of Computer Science, Purdue University.
IEEE Xplore Digital Library Sear Results for "detection of unknown computer worms". Http//ieeexplore.ieee.org/searchresult.jsp?SortField=Score&SortOrder=desc- &ResultC . . . , (Accessed on Aug. 28, 2009).
Isohara, Takamasa, Keisuke Takemori, and Ayumu Kubota. "Kernel-based behavior analysis for android malware detection." Computational intelligence and Security (CIS), 2011 Seventh International Conference on. IEEE, 2011.
Kaeo, Merike, "Designing Network Security", ("Kaeo"), (Nov. 2003).
Kevin A Roundy et al: "Hybrid Analysis and Control of Malware", Sep. 15, 2010, Recent Advances in Intrusion Detection, Springer Berlin Heidelberg, Berlin, Heidelberg, pp. 317-338, XP019150454 ISBN:978-3-642-15511-6.
Kim, H., et al., "Autograph: Toward Automated, Distributed Worm Signature Detection", Proceedings of the 13th Usenix Security Symposium (Security 2004), San Diego, (Aug. 2004), pp. 271-286.
King, Samuel T., et al., "Operating System Support for Virtual Machines", ("King"), (2003).

(56) References Cited

OTHER PUBLICATIONS

Krasnyansky, Max , et al., Universal TUN/TAP driver, available at https://www.kernel.org/doc/Documentation/networking/tuntap.txt (2002) ("Krasnyansky").

Kreibich, C. , et al., "Honeycomb-Creating Intrusion Detection Signatures Using Honeypots", 2nd Workshop on Hot Topics in Networks (HotNets-11), Boston, USA, (2003).

Kristoff, J. , "Botnets, Detection and Mitigation: DNS-Based Techniques", NU Security Day, (2005), 23 pages.

Leading Colleges Select FireEye to Stop Malware-Related Data Breaches, FireEye Inc., 2009.

Li et al., A VMM-Based System Call Interposition Framework for Program Monitoring, Dec. 2010, IEEE 16th International Conference on Parallel and Distributed Systems, pp. 706-711.

Liljenstam, Michael , et al., "Simulating Realistic Network Traffic for Worm Warning System Design and Testing", Institute for Security Technology studies, Dartmouth College ("Liljenstam"), (Oct. 27, 2003).

Lindorfer, Martina, Clemens Kolbitsch, and Paolo Milani Comparetti. "Detecting environment-sensitive malware." Recent Advances in Intrusion Detection. Springer Berlin Heidelberg, 2011.

Lok Kwong et al: "DroidScope: Seamlessly Reconstructing the OS and Dalvik Semantic Views for Dynamic Android Malware Analysis", Aug. 10, 2012, XP055158513, Retrieved from the Internet: URL:https://www.usenix.org/system/files/conference/usenixsecurity12/sec12- -final107.pdf [retrieved on Dec. 15, 2014].

Marchette, David J., "Computer Intrusion Detection and Network Monitoring: A Statistical Viewpoint", ("Marchette"), (2001).

Margolis, P.E. , "Random House Webster's 'Computer & Internet Dictionary 3rd Edition'", ISBN 0375703519, (Dec. 1998).

Moore, D. , et al., "Internet Quarantine: Requirements for Containing Self-Propagating Code", INFOCOM, vol. 3, (Mar. 30-Apr. 3, 2003), pp. 1901-1910.

Morales, Jose A., et al., ""Analyzing and exploiting network behaviors of malware."", Security and Privacy in Communication Networks. Springer Berlin Heidelberg, 2010. 20-34.

Mori, Detecting Unknown Computer Viruses, 2004, Springer-Verlag Berlin Heidelberg.

Natvig, Kurt , "SANDBOXII: Internet", Virus Bulletin Conference, ("Natvig"), (Sep. 2002).

NetBIOS Working Group. Protocol Standard for a NetBIOS Service on a TCP/UDP transport: Concepts and Methods. STD 19, RFC 1001, Mar. 1987.

Newsome, J. , et al., "Dynamic Taint Analysis for Automatic Detection, Analysis, and Signature Generation of Exploits on Commodity Software", In Proceedings of the 12th Annual Network and Distributed System Security, Symposium (NDSS '05), (Feb. 2005).

Newsome, J. , et al., "Polygraph: Automatically Generating Signatures for Polymorphic Worms", In Proceedings of the IEEE Symposium on Security and Privacy, (May 2005).

Nojiri, D. , et al., "Cooperation Response Strategies for Large Scale Attack Mitigation", DARPA Information Survivability Conference and Exposition, vol. 1, (Apr. 22-24, 2003), pp. 293-302.

Oberheide et al., CloudAV.sub.--N-Version Antivirus in the Network Cloud, 17th USENIX Security Symposium USENIX Security '08 Jul. 28-Aug. 1, 2008 San Jose, CA.

Reiner Sailer, Enriquillo Valdez, Trent Jaeger, Roonald Perez, Leendert van Doorn, John Linwood Griffin, Stefan Berger., sHype: Secure Hypervisor Approach to Trusted Virtualized Systems (Feb. 2, 2005) ("Sailer").

Silicon Defense, "Worm Containment in the Internal Network", (Mar. 2003), pp. 1-25.

Singh, S. , et al., "Automated Worm Fingerprinting", Proceedings of the ACM/USENIX Symposium on Operating System Design and Implementation, San Francisco, California, (Dec. 2004).

Spitzner, Lance , "Honeypots: Tracking Hackers", ("Spizner"), (Sep. 17, 2002).

The Sniffers's Guide to Raw Traffic available at: yuba.stanford.edu/.about.casado/pcap/section1.html, (Jan. 6, 2014).

Thomas H. Ptacek, and Timothy N. Newsham , "Insertion, Evasion, and Denial of Service: Eluding Network Intrusion Detection", Secure Networks, ("Ptacek"), (Jan. 1998).

U.S. Pat. No. 8,171,553 filed Apr. 20, 2006, Inter Parties Review Decision dated Jul. 10, 2015.

U.S. Pat. No. 8,291,499 filed Mar. 16, 2012, Inter Parties Review Decision dated Jul. 10, 2015.

Venezia, Paul , "NetDetector Captures Intrusions", InfoWorld Issue 27, ("Venezia"), (Jul. 14, 2003).

Wahid et al., Characterising the Evolution in Scanning Activity of Suspicious Hosts, Oct. 2009, Third International Conference on Network and System Security, pp. 344-350.

Whyte, et al., "DNS-Based Detection of Scanning Works in an Enterprise Network", Proceedings of the 12th Annual Network and Distributed System Security Symposium, (Feb. 2005), 15 pages.

Williamson, Matthew M., "Throttling Viruses: Restricting Propagation to Defeat Malicious Mobile Code", ACSAC Conference, Las Vegas, NV, USA, (Dec. 2002), pp. 1-9.

Yuhei Kawakoya et al: "Memory behavior-based automatic malware unpacking in stealth debugging environment", Malicious and Unwanted Software (Malware), 2010 5th International Conference on, IEEE, Piscataway, NJ, USA, Oct. 19, 2010, pp. 39-46, XP031833827, ISBN:978-1-4244-8-9353-1.

Zhang et al., The Effects of Threading, Infection Time, and Multiple-Attacker Collaboration on Malware Propagation, Sep. 2009, IEEE 28th International Symposium on Reliable Distributed Systems, pp. 73-82.

\* cited by examiner

POST-INTRUSION DETECTION OF CYBER-ATTACKS DURING LATERAL MOVEMENT WITHIN NETWORKS

CROSS-REFERENCE TO RELATED APPLICATIONS

This application is a continuation-in-part application of U.S. patent application Ser. No. 15/638,262 filed Jun. 29, 2017, the entire contents of which are incorporated by reference.

FIELD

Embodiments of the disclosure relate to cybersecurity. More particularly, one embodiment of the disclosure relates to detection of cyber-attacks within enterprise networks.

GENERAL BACKGROUND

Electronic computing systems provide useful and necessary services that assist individuals in business and in their everyday lives. In recent years, a growing number of cyber-attacks are being conducted on governmental agencies and private enterprises. These cyber-attacks tend to focus on computing systems with network connectivity (referred to as "network devices") communicatively coupled to a network within the governmental agency or private enterprise. Herein, such a network is called an enterprise network, which term is used to refer to a proprietary, non-public, private or local network in contra-distinction to a public network such as the Internet.

Normally, cyber-attacks are started by exploiting a security vulnerability in measures or devices employed to protect the network, or in computer systems or software installed and operating on the computing systems, thereby allowing threat actors and/or malicious software (malware) to gain entrance into the network and onto the network device. For example, the threat actor may want to gain entrance for any of a variety of malicious purposes, such as to (i) monitor (e.g., surveil) activity on a network or network device, or (ii) cause harm to the network or network device, such as intentional corruption, lock down or theft (exfiltration) of data (e.g., credentials, financial information such as credit card information, identity information, military secrets, or the like). Examples of malware may include, but are not limited or restricted to, viruses, trojan horses, rootkits, worms, advanced persistent threats (APTs), keyloggers, and/or other programs intended to compromise network devices as well as the data stored on the network device and other resources connected to the network.

For cyber-defense, enterprises will often employ security devices to detect cyber-attacks at the periphery of its enterprise network as well as on computer devices (e.g., anti-virus programs) connectable to the network. The security devices deployed at the periphery of the enterprise network are located where network traffic transits into a trusted zone established by the enterprise network from an untrusted network such as a public network (e.g., the Internet). These periphery-deployed security devices may include firewalls, intrusion detection devices (IDS's), and other devices to detect malware in the network traffic entering the local network, and, for some devices, in outbound traffic leaving the enterprise network. These security devices are designed to detect early phases of Web-based attacks, such as initial infiltration, malware downloads, and command and control (CnC) callbacks.

Conventional security measures are also deployable on a network device itself (also referred to as an endpoint or host), for example, a laptop, notebook, tablet, smart phone, server, and any other computer system or device adapted for communication over the enterprise network. These security measures may include anti-virus software that attempts to match the network traffic against a library of signatures of known malware. Still other security measures intended for deployment on hosts may include software agents installed on the hosts that monitor processing activities, seeking to identify indicators of compromise (IOCs) evidencing unauthorized activities on the host and thus suggesting a cyber-attack may be underway. Upon detecting malware or IOCs, the security measures deployed at the periphery of the network or on the host may present an alert to a network or security administrator or a user for her or his situational evaluation and, if appropriate, to prompt and guide remedial action.

While security measures deployed at the periphery of the enterprise networks and in hosts can protect against many cyber-attacks, they may be unable to provide a desired high level of cyber protection. For instance, threat actors may design their malware to constantly change (mutate) in form to defeat signature matching techniques employed by firewalls, IDS's, anti-virus programs and the like. This type of advanced malware is referred to as "polymorphic malware." Also, the threat actors may utilize new malware in an attack that has not previously been detected, that is, "zero day" malware, for which signatures have not been developed. Moreover, malware may be introduced into an enterprise network other than through network traffic entering at the periphery of the enterprise network, for example, by a previously infected, portable storage device or memory stick connected directly to a host within the enterprise network.

Security measured may also be limited in effectiveness for additional reasons. For example, the IOC detection utilized by hosts can be challenging as, after infiltration of the malware onto the hosts, the operations by the malicious software may bear a strong similarity to legitimate and typical processing activities on the host, resulting in the potential for a high number of false positives or false negatives in detection. In addition, threat actors may gain entrance to an enterprise network or network device without relying on malware for system or software exploitation, such as through phishing email, credential stealing or otherwise taking advantage of inattentive users and administrators.

Moreover, sophisticated malware may be designed to further a multi-phase cyber-attack. As an example of such an attack, in a first phase, the malware infiltrates an enterprise network and obtains a foothold within a network device, thereby defeating or evading detection by the security devices employed at both "lines" of defense (i.e., the network periphery and the network device). Thereafter, after the victim network device is compromised, in subsequent phases, the malware may instigate various types of malicious network activities inside the enterprise network, including, for example, the malware moving laterally within the network to infect other network devices within the network or the malware surveilling network activities, inventorying network resources (e.g., network mapping, host enumeration), or accessing data stored in data centers or elsewhere within the network.

It would be desirable to provide a third line of defense that can detect cyber-attacks during lateral movement within the enterprise network, and differentiate the malicious activities from normal network activities to detect the cyber-attacks during such post-infiltration phases.

BRIEF DESCRIPTION OF THE DRAWINGS

Embodiments of the disclosure are illustrated by way of example and not by way of limitation in the figures of the accompanying drawings, in which like references indicate similar elements and in which.

DETAILED DESCRIPTION

I. Overview

Figure 1A:
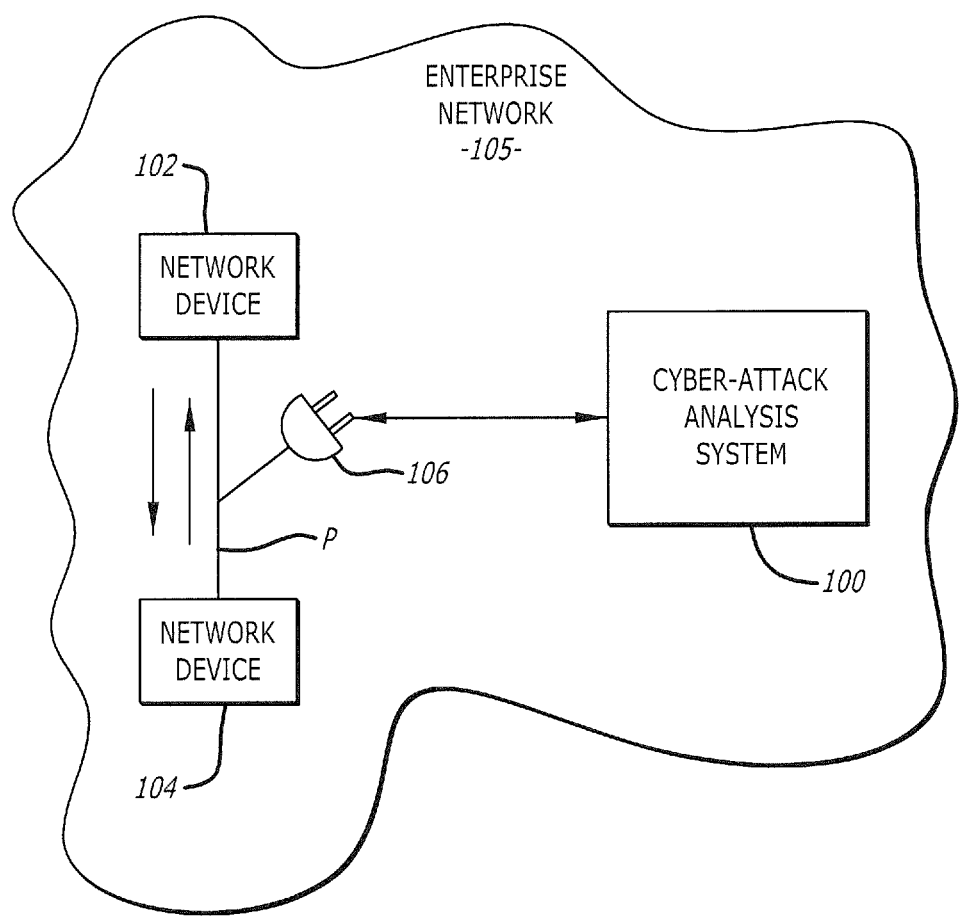
FIG. 1A is an exemplary embodiment illustrating a cyber-attack analysis system deployment to detect a cyber-attack during lateral movement within an enterprise network.

Embodiments of the invention can find applicability in a variety of contexts including detection of cyber-attacks during lateral movement within an enterprise network after gaining entry (post-intrusion) into the enterprise network and compromising a network device within the enterprise network. Lateral movement of a cyber-attack can take the form of malicious traffic traversing between network devices within the enterprise network. This malicious traffic is sometimes referred to as "east-west" traffic, and generally involves communications between network devices within the enterprise network, in contradistinction to "north-south" traffic which involves communications intended to traverse the periphery of the network.

Detection of cyber-attacks by inspecting intercepted internal enterprise network traffic can be challenging as much of the malicious traffic can bear a strong similarity to legitimate, normal traffic exchanged within the network. For example, the malicious traffic can include communications which further the cyber-attack while not containing malware. These communications may include, for example, server-client communications and requests/responses regarding privilege escalation, remote task execution, data access and/or exfiltration, and the like.

In general, a cyber-attack analysis system in accordance with embodiments of the invention includes logic to capture communications in internal traffic traversing the enterprise network from one network device to another within the enterprise network. Often the second network device is a file or application server (e.g., within a data center) and thus the captured communications often employs a client-server protocol (such as a Server Message Block (SMB) protocol). Other times, the second network device is another user's computer (endpoint), server or other computer system or resource.

The cyber-attack analysis system according to these embodiments also includes analysis logic to analyze the communications to identify and collect indicators of potential compromise associated with analyzed communications and their content within the enterprise network traffic. An "indicator" is analytical information resulting from an analysis of an object (that is, one or more of the communications themselves or content within and extracted from the communications). Herein, the detection involves static analysis of an object (e.g., analysis of the characteristics of the object without execution of the object) and/or dynamic analysis of an object (e.g., executing the object and monitoring the behavior of the object and/or the software used in execution of the object).

The cyber-attack analysis system according to these embodiments also includes correlation logic to assemble one or more groups of "weak" indicators, each group consisting of multiple (i.e., two or more) "weak" indicators from the set of indicators. A weak indicator corresponds to data that, by itself, is not definitive as to a determination of a cyber-attack. The indicators may be assigned to a group based on one or more "relatedness" (grouping) factor that the indicators of a group share in common, sometimes referred to as an index parameter. For example, the "weak" indicators may be grouped according to a selected time period during which each of these indicators was detected. The selected time period (i.e., sliding window) may vary depending on the resources (e.g., processing capacity, available memory, etc.) available to the cyber-attack analysis system. Furthermore, the set of indicators may be grouped in accordance with dynamically modifiable rules available to the correlation logic. After this grouping, the correlation logic conducts an analysis to determine whether the group of indicators is correlated with known malicious patterns or sequences (ordering) of indicators, thereby producing a "strong" indicator. A strong indicator assists the cyber-attack analysis system in determining that a cyber-attack is being conducted on a particular computer system or enterprise, and a presence of the strong indicator may be reported as part of an alert (warning) to a security or network administrator.

Accordingly, as described, the correlation logic is configured to improve cyber-attack detection effectiveness while monitoring internal network traffic (e.g., identifying compromised network devices communicating inside an enterprise network). More specifically, based on a plurality of prescribed correlation rules that are formulated and coded from experiential knowledge and previous malware analysis results, the correlation logic is configured to generate a "strong" indicator of malware or a cyber-attack (hereinafter, "indicator") from a group of weak indicators. Herein, a "strong indicator" corresponds to data that, based on its presence alone, represents a high likelihood (e.g., probability exceeding a first selected threshold of a cyber-attack. In contrast, a "weak indicator" represents a likelihood less than the first selected threshold of a cyber-attack. The weak indicator has (i) a low correlation with known cyber-attacks (e.g., malware), (ii) a high correlation with normal or expected characteristics or behaviors (during execution) of the internal traffic, or (iii) both. The correlation levels for a weak indicator are such that a conventional cyber-attack analysis schemes would not generally base a determination of a cyber-attack (e.g., malware) on such a weak indicator without a high risk (likelihood) of the determination being a false positive.

According to one embodiment of the disclosure, operating in accordance with the prescribed correlation rules, the correlation logic receives the plurality of indicators from one or more sources (e.g., the described analysis logic) and may separate the strong indicators from the weak indicators. In conventional malware analysis schemes, the weak indicators may be discarded; however, as set forth in this disclosure, some or all of the received weak indicators are combined to form one or more groups (i.e., combinations) of indicators, each group includes plural weak indicators. The group of indicators may be based on a temporal relationship such as, for example, each weak indicator from the group occurred during a predetermined period of time (i.e., a prescribed window). Alternatively, or in addition to receipt (or occurrence) of the indicators within the predetermined time period, the group of indicators may be based, at least in part, on particulars associated with the prescribed correlation rules. These particulars may include weightings assigned to each type of weak indicator or frequency of occurrence of certain weak indicators for example.

After forming the group of indicators, the correlation logic conducts an analysis to determine whether the group of indicators (or a portion thereof) corresponds to a strong indicator. This analysis is conducted to determine compliance (or non-compliance) with the prescribed correlation rules that constitute rule-encoded attack characteristics and/or behaviors. Stated differently, the correlation logic determines, through experiential knowledge and intelligence from a variety of sources (e.g., deployed malware detection systems, incident response findings, and intelligence on malicious actors), whether there is a first prescribed level of correlation between the group of indicators and different patterns and/or sequences (ordering) of indicators of known malware (e.g., identical indicators, or substantially similar indicators, e.g., prescribed comparison rate, etc.). Responsive to determining that the first prescribed level of correlation has been achieved, the group of indicators collectively corresponds to a newly determined strong indicator. The correlation logic provides information associated with the newly determined strong indicator to reporting logic while, depending on the correlation rules governing the analysis, certain groups of indicators (e.g., a group of indicators that almost constitutes a "strong" indicator) may be returned to the correlation logic for further malware analysis.

The further analysis may involve, for example, combining the group of weak indicators with one or more additional indicators, modifying the prescribed level of correlation (matching) to thereby reconstitute the group (eliminating some indictors or adding additional ones, or otherwise modifying the group). Furthermore, the prescribed correlation rules may be updated and modified, as the strength of indicators typically change over time as the threat landscape evolves. Also, the rules may be altered based on new intelligence gathered from internal heuristics, incident response filing, third party sources, or the like.

An illustrative example of the operations conducted by the correlation logic to generate a "strong" indicator from a group of "weak" indicators is described below. First, the correlation engine receives indicators, which may include strong indicators and/or weak indicators. Second, according to one embodiment of the disclosure, a plurality of the received indicators, wholly or at least primarily weak indicators, are extracted from the received information. (Weak indicators may be grouped in some applications of the invention with one or more strong indicators to produce an even stronger indicator.) Third, the correlation logic conducts (i) a first grouping operation on the plurality of indicators in accordance with a first index parameter (i.e., first factor) to produce a first group (e.g., two or more) of indicators and (ii) a second grouping operation on the first group of indicators in accordance with a second index parameter (i.e., second factor) to produce a second group (e.g., two or more) of indicators. Weak indicator correlation rules specify a grouping scheme based on specified indicator factors and index parameters. The first index parameter may be a time-based index parameter (e.g., indicators occurring or detected during a predetermined period of time) while the second index parameter may be based on certain context information that may accompany the indicators such as a source identifier that identifies the network device providing the received indicator (e.g., source Internet Protocol "IP" address, host name, user name, etc.). Fourth, the correlation logic determines, for each of the first and second groups, whether there exists a first prescribed level of correlation between the group of indicators and different patterns and/or sequences of indicators of known cyber-attacks (e.g., malware) or, where a positive determination means that one or both of the first and second groups is a strong indicator. Fifth, the correlation logic determines that a cyber-attack is in progress or has occurred based, at least in part, on the strong indicator or indicators represented by the first and second groups. Finally, reporting logic issues an alert to a security administrator, e.g., an email sent over a communication or computer network, as to the classification indicating a cyber-attack.

In one embodiment of the disclosure, a cyber-attack analysis system implementing the above-described communications capture logic, analysis logic, and correlation logic is resident in a network device that resides on-premises and within the enterprise network (e.g., local area network). The cyber-attack analysis system is configured to analyze the internal network traffic including information (including weak indicators) between any and all network devices connected to the enterprise network (e.g., network traffic sent from one network device connected to the enterprise network to another network device connected to the same enterprise network. As an alternative embodiment, the cyber-attack analysis system may be a virtual implemented as a (software) deployment, with the operability of the cyber-attack analysis system being provided, at least in part, by an operating system or other software running on an on-premises network device or remote analysis service. In other alternative embodiments, a first network device serves as a communications capture device to capture the traffic in flight, and a remotely located, second network device includes the analysis logic and correlation logic. Both the first and second network devices may be sold as separate executable software packages for on-premises enterprise deployment or the communications capture device can be sold as a software package and the analysis device sold as a cloud-based service coupled over a public network to the receive the communications. In a variation of this scheme, the first network device can include both the communications capture device and the analysis logic and the second network device or the cloud-based service can include the correlation logic.

Aspects of the invention may find application in a variety of cybersecurity contexts—for instance, in analyzing the internal network traffic between network devices (e.g., hosts) connected for communication over an enterprise network during or after a potential cyber-attacks as described above, and/or in analyzing internal network traffic traversing between enterprise networks—with or without an intermediate public network—thereby enhancing the detection of cyber-attacks moving between network devices in a variety of networking architectures. Regardless of the deployment architecture, the cyber-attack analysis system described above receives internal network traffic captured during transit over an enterprise network, identifies indicators, groups, correlates and classifies the indicators and, when applicable, issues alerts to administrators to identify threats resident in the enterprise network. However, in alternative applications, aspects of the invention can also be deployed to detect cyber-attacks and/or malware from weak indicators obtained from other types of sources.

Hence, the cyber-attack analysis system is advantageous over conventional analyses in that it provides a further "line of defense" to enhance detection of cyber-attacks even where only weak indicators of the cyber-attack are available.

Terminology

In the following description, certain terminology is used to describe various features of the invention. For example, each of the terms "logic" and "component" may be representative of hardware, firmware or software that is configured to perform one or more functions. As hardware, the term logic (or component) may include circuitry having data processing and/or storage functionality. Examples of such circuitry may include, but are not limited or restricted to a hardware processor (e.g., microprocessor, one or more processor cores, a digital signal processor, a programmable gate array, a microcontroller, an application specific integrated circuit "ASIC", etc.), a semiconductor memory, or combinatorial elements.

Additionally, or in the alternative, the logic (or component) may include software such as one or more processes, one or more instances, Application Programming Interface(s) (API), subroutine(s), function(s), applet(s), servlet(s), routine(s), source code, object code, shared library/dynamic link library (dll), or even one or more instructions. This software may be stored in any type of a suitable non-transitory storage medium, or transitory storage medium (e.g., electrical, optical, acoustical or other form of propagated signals such as carrier waves, infrared signals, or digital signals). Examples of a non-transitory storage medium may include, but are not limited or restricted to a programmable circuit; non-persistent storage such as volatile memory (e.g., any type of random access memory "RAM"); or persistent storage such as non-volatile memory (e.g., read-only memory "ROM", power-backed RAM, flash memory, phase-change memory, etc.), a solid-state drive, hard disk drive, an optical disc drive, or a portable memory device. As firmware, the logic (or component) may be stored in persistent storage.

Herein, a "communication" generally refers to related data that is received, transmitted, or exchanged, such as within a communication session between network devices, and including communications propagated over an enterprise network. The data may include a plurality of packets, where a "packet" broadly refers to a series of bits or bytes having a prescribed format. Alternatively, the data may include a collection of data that may take the form of an individual or a plurality of packets carrying related payloads, e.g., a single webpage received over a network.

The phrase "client-server communication protocol" generally refers to a communication protocol used for communications between a client and a server. In a client/server model of information delivery, many clients access data and other resources of servers located, e.g., remotely in a data center. In this model, the client may comprise an endpoint, or more specifically, an application executing on an endpoint that "connects" to a server over an enterprise network, such as a point-to-point link, shared local area network (LAN), wide area network (WAN), or virtual private network (VPN) implemented over a public network such as the Internet.

Examples of a client-server communication protocol include the Server Message Block Protocol ("SMB"), and its variants, implementations, and dialects. The SMB protocol is a response-request protocol in that a plurality of messages are exchanged between the client and the server to establish a connection for communication between the client and server. The communication messages exchanged may include a client request and a server response. More specifically, a client may request the services of the server by issuing file-based and block-based protocol messages (in the form of packets) called client requests to the remote server over the enterprise network. For example, the client may use such messages to request to open, read, move, create, update the data. The client may also use the request to communicate with a server program (e.g., print services) operating on the server. The server may respond, after authentication and authorization, by fulfilling the client's request, e.g., accessing data stored on the server or stored remotely in a database or other network storage to provide the requested data to the client or otherwise executing the requested operation. In the OSI networking model, the SMB protocol typically operates as an Application layer or a Presentation layer protocol. Depending on the dialect, the SMB Protocol can be used without a separate Transport protocol, or can rely on lower-level protocols for transport. Typical current implementations support SMB directly over TCP/IP.

The term "object," as used herein, generally relates to a communication or a group of one or more communications, or content (or a reference for accessing such content), including content within the communication or communications. Typically, the communication has a logical structure or organization. The content may include messages, commands, requests or responses to requests, as are often specified by applicable communication protocols to which the communications may comply, more or less. The content may also include an executable, an application, program, code segment, a script, dynamic link library "dll" or any file in a format that can be directly executed by a computer such as a file with an ".exe" extension, etc.), a non-executable (e.g., a storage file; any document such as a Portable Document Format "PDF" document; a word processing document such as Word® document; an electronic mail "email" message, web page, etc.), or simply a collection of related data (e.g., packets).

The term "computerized" generally represents that any corresponding operations are conducted by hardware in combination with software and/or firmware. The term "data store" generally refers to a data storage device such as the non-transitory storage medium described above, which may include a repository for non-persistent or persistent storage of collected data.

According to one embodiment of the disclosure, the term "malware" may be broadly construed as any instructions, codes, or communications that initiate or further a cyber-attack. Malware may prompt or cause unauthorized, anomalous, unintended and/or unwanted behaviors or operations constituting a security compromise of information infrastructure. For instance, malware may correspond to a type of malicious computer code that, as an illustrative example, executes an exploit to take advantage of a vulnerability in a network, network device or software, to gain unauthorized access, harm or co-opt operations of the network, the network device of the software or to misappropriate, modify or delete data. Alternatively, as another illustrative example, malware may correspond to information (e.g., executable code, script(s), data, command(s), etc.) that is designed to cause a network device to experience anomalous (unexpected or undesirable) behaviors. The anomalous behaviors may include a communication-based anomaly or an execution-based anomaly, which, for example, could (1) alter the functionality of a network device executing application software in an atypical manner; (2) alter the functionality of the network device executing that application software without any malicious intent; and/or (3) provide unwanted functionality which may be generally acceptable in another context.

A "characteristic" includes data associated with an object under analysis that may be collected without execution of the object such as metadata associated with the object (e.g., size, name, path, etc.) or content of the object (e.g., communications headers and payloads) without execution of the selected object. A "behavior" is an activity that is performed in response to execution of the object.

The term "network device" may be construed as any electronic computing system with the capability of processing data and connecting to a network. The network may be a non-public (private) network such as an enterprise network, a wireless non-public area network (WLAN), a local area network (LAN), a wide area network (WAN), a virtual private cloud (VPC), or the like. Examples of a network device may include, but are not limited or restricted to an endpoint (e.g., a laptop, a mobile phone, a tablet, a computer, an industrial controller, an info-entertainment console, a copier, etc.), a standalone appliance, a host, a server, a router or other intermediary communication device, a firewall, etc.

The term "transmission medium" may be construed as a physical or logical communication path between two or more network devices or between components within a network device. For instance, as a physical communication path, wired and/or wireless interconnects in the form of electrical wiring, optical fiber, cable, bus trace, or a wireless channel using radio frequency (RF) or infrared (IR), may be used. A logical communication path may simply represent a communication path between two or more network devices or between components within a network device.

Finally, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

As this invention is susceptible to embodiments of many different forms, it is intended that the present disclosure is to be considered as an example of the principles of the invention and not intended to limit the invention to the specific embodiments shown and described.

General Architecture

Referring to FIG. 1A, an exemplary block diagram of an embodiment illustrating a cyber-attack analysis system 100 coupled to intercept communications along a communication path designated "p" between a first, potentially compromised network device 102 and a second network device 104 via a network tap 106 (described below) to detect a cyber-attack during lateral movement between the network devices 102, 104. The communication path p is shown graphically as a single line representing an enterprise network 105.

The communications intercepted by the cyber-attack analysis system 100 may appear normal, though may be indicative, particularly in combination with other communications, of a cyber-attack. For example, the first network device 102 may be an endpoint or host under user control, and the second network device 104 may be another host or may be a server in a data center. In this case, a communication sent by the first network device 102 may be a request for information as to what other hosts are on the enterprise network (i.e., host mapping), a request for privilege escalation, a remote task execution (e.g., modify a registry, access event logs, or execute commands on remote network device), or a request to access data stored, for example, in the data center. The responses to these communications, for example, sent by the second network device 104, are also communications of interest. If a communication appears normal, it, in and of itself, may be a weak indicator of a cyber-attack; however, the combination of one or more of the original communications, say from the first network device 102 and one or more response communications, say from the second network device 104, may constitute a strong indication of a cyber-attack, perhaps representing different phases of the attack. Of course, the communication may itself be a strong indicator of a cyber-attack, for example, where the communication, or a portion thereof, matches a signature of known malware.

Figure 1B:
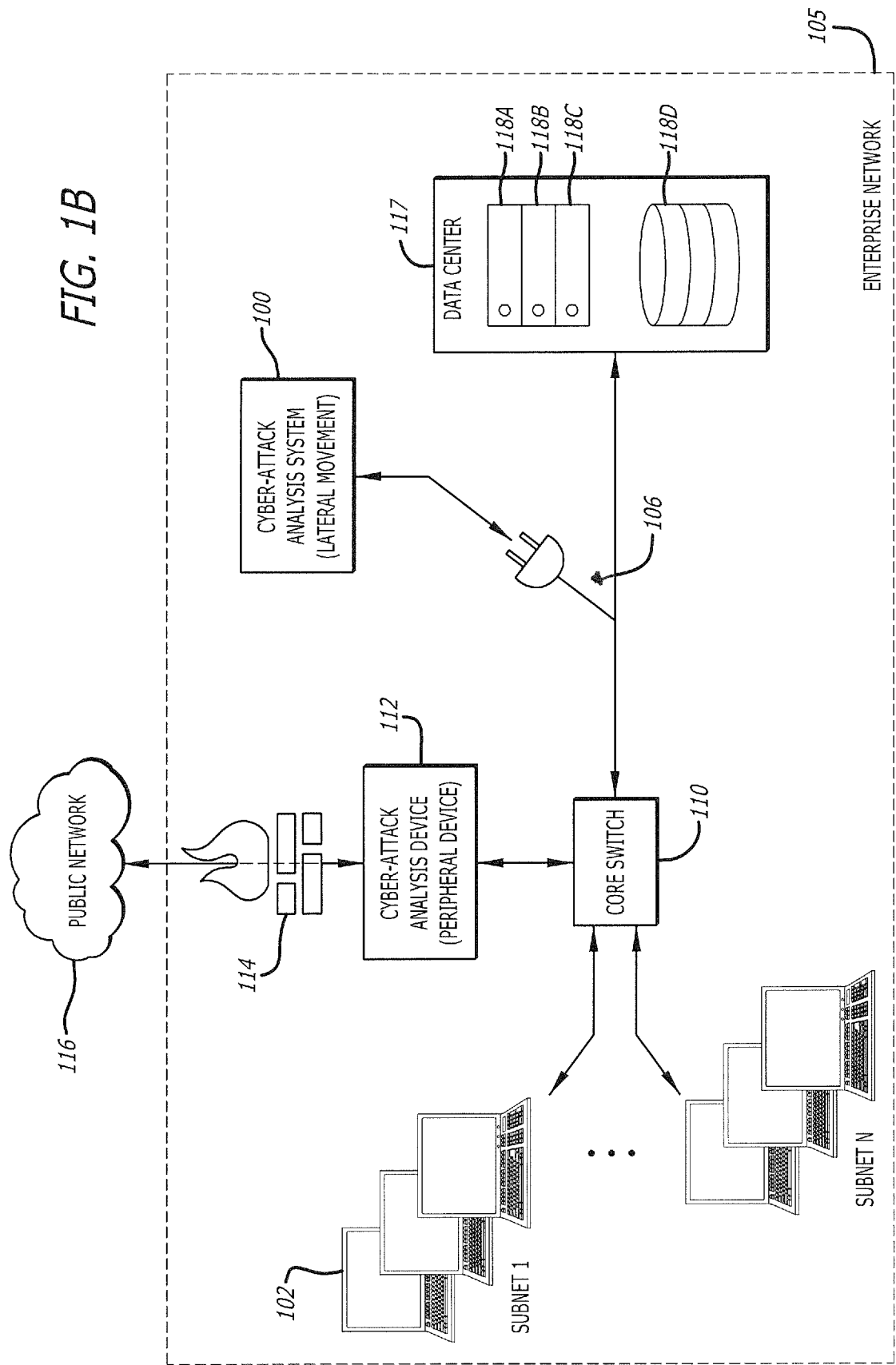
FIG. 1B is another exemplary embodiment illustrating a cyber-attack analysis system deployment to detect a cyber-attack during lateral movement within an enterprise network.

Referring to FIG. 1B is another exemplary block diagram illustrating a cyber-attack analysis system 100 deployed to detect a cyber-attack during lateral movement within an enterprise network 105. In this view, the network device 102 operationally located within a subnet 1 of a group of subnets (labelled 1 . . . N, where "N" is a positive integer) is communicating via a configurable core switch 110 with a data center 117 and, more specifically, with a file server 118A of the datacenter 117. The data center 117 includes, in addition to file server 1118A, other file servers designated 118B, 118C (each file server representing a network device) as well as a representative network resource 118D (e.g., a database). During lateral movement of a cyber-attack, communications (e.g., data requests) may be initiated for example by malware or an threat actor that has gained a foothold within the network device 102 to obtain access to the file server 118A and thereby to stored data in the database 118D, and the requested data may be returned to the network device 102 in response. Here too, the network tap 106 provides a copy of the communications (i.e., the request and the response from the file server) to the cyber-attack analysis system 100. The cyber-attack analysis system 100 is deployed to detect potential indicators of a cyber-attack in internal traffic within the enterprise network between network devices within the network, such as the network device 102 and other network devices within the subnets 190, or between any of those network devices and the data center 117.

It should be noted that other communications may be received (e.g., downloaded) from or sent to the public network 116 and passed through the firewall 114 and the cores switch 110 (or vice versa), which may route these to a destination network device in subnets 190. Operationally interposed between the firewall 114 and the core switch 110 is a cyber-attack analysis system 112, which is deployed at the periphery of the enterprise network 105 to analyze the downloads (and communications directed to or from the public network 116) for malware or other indicators of a cyber-attack. Accordingly, it should be understood that the cyber-attack analysis system 100 examines east-west traffic (where communications are pursuant, for example, to client-server communication protocols), while the cyber-attack analysis system examines north-south traffic (where communications are pursuant, for example, public network protocols, such as the Internet Protocol (IP), Transmission Control Protocol/Internet Protocol (TCP/IP) or Hypertext Transfer Protocol (HTTP).

In some embodiments, the cyber-attack analysis systems 100 and 112 may be deployed as a single system with combined functionality to perform cyber-attack analysis on both east-west and north-south traffic. In the same embodiments or other embodiments, the combined cyber-attack analysis system may base its determination of cyber-attacks on any of (i) strong indicators alone, (ii) a combination of strong and weak indicator indicators, or (iii) one or more groups of weak indicators that together produce one or more strong indicators.

Figure 1C:
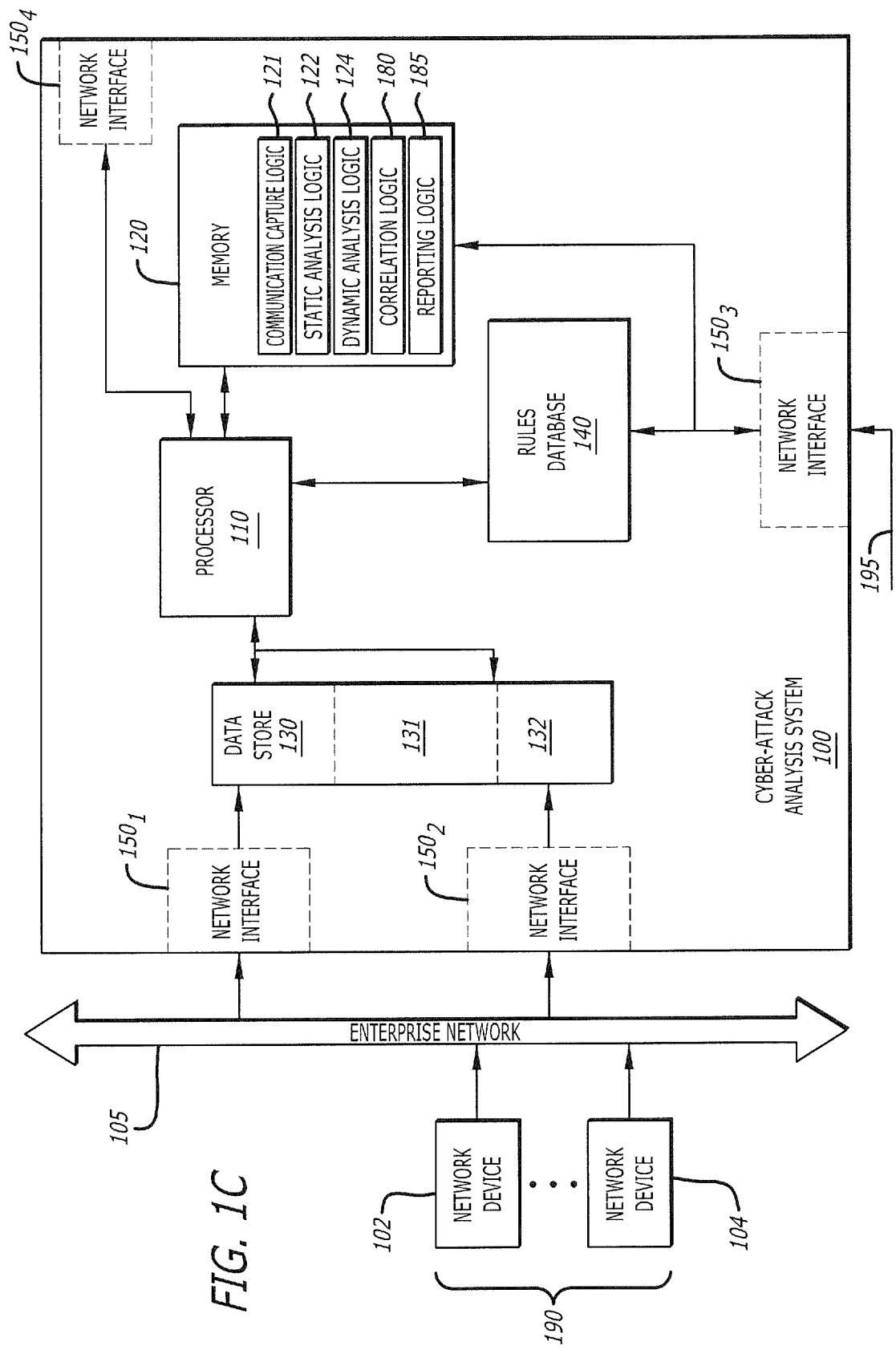
FIG. 1C is an exemplary block diagram of a general, logical representation of a cyber-attack analysis system.

Referring now to FIG. 1C, an exemplary block diagram of an embodiment of an architecture of a cyber-attack analysis system 100 is shown. Herein, the cyber-attack analysis system 100 includes a plurality of components, including one or more hardware processors (referred to as "processor") 110, a memory 120, one or more data stores (hereinafter, "data store") 130, a rules database 140 and/or one or more interfaces $150_1$-$150_M$ (M>1), which may include network interfaces and/or input/output (I/O) interfaces. According to this embodiment of the disclosure, these components may be communicatively coupled together by a transmission medium 160 such as any type of interconnect (e.g., bus, wires, printed connections, one or more APIs, etc.), and the components are at least partially encased in a housing 170 made entirely or partially of a rigid material (e.g., hardened plastic, metal, glass, composite, or any combination thereof). The housing 170 protects these components from environmental conditions.

The processor 110 is a multi-purpose, programmable component that accepts digital data as input, processes the input data according to stored instructions, and provides results as output. One example of a processor may include an Intel® x86 central processing unit (CPU) with an instruction set architecture. Alternatively, the processor 110 may include another type of CPU, a digital signal processor (DSP), an Application Specific Integrated Circuit (ASIC), a field-programmable gate array (FPGA), or the like.

According to one embodiment of the disclosure, the processor 110 is communicatively coupled to the memory 120 and the data store 130 via the transmission medium 160. The data store 130 is adapted to store at least indicators (herein, "indicators"). These indicators include characteristics and/or behaviors collected from analyses conducted remotely from the cyber-attack analysis system 100 (e.g., indicators from different network devices such as endpoint device, security appliance, and/or cloud-based security services). Additionally, or in the alternative, the indicators may be based on analyses conducted internally within the cyber-attack analysis system 100. For instance, the cyber-attack analysis system 100 may be adapted to intercept communications originating from a first network device 102 (FIG. 1A) and being sent, for example, to a second network device 104 (FIG. 1A). The communications may be intercepted while in transit over a communication path p (FIG. 1A) between hosts 102, 104 (FIG. 1A). The communications may also be analyzed by other cyber-security devices to generate the indicators and provided to the cyber-attack analysis system engine 100 for further analysis, as further described below.

Referring still to FIG. 1C, the cyber-attack analysis system 100 may include network interface logic $150_1$, which may be implemented to receive and mirror network traffic on the enterprise network 105 (e.g., a network test access point (TAP) that extracts communications from the network traffic, and passes communications via one of its ports back to the enterprise network 105 and towards its original destination, while providing a copy (mirror) of all or a portion of the network traffic over another one of its ports, etc.) to the data store 130. The TAP may be implemented as a Switch Port Analyzer (SPAN) port. The network interface $150_1$ or, in other embodiments, the processor 110 executes communication capture logic 121, which extracts individual communications or groups of related communications, and, in some cases, the contents of the communication or communications, which are referred to herein as an object or objects. These objects are provided to a first portion 131 of the data store 130 (referred to as "raw data store" 131) for storage and later access. In some embodiments, the processor 110 may conduct analyses on the objects stored in the raw data store 131 upon execution of static analysis logic 122 and/or dynamic analysis logic 124 stored in the memory 120. When executed by the processor 110, the static analysis logic 122 is configured to analyze contents (i.e., characteristics) of an object under analysis. When executed by the processor 110, the dynamic analysis logic 124 provisions at least one virtual machine (VM), which executes the object and monitors behaviors of the object and/or any applications executing the object within the VM. The monitored behaviors of the object and/or applications running in the VM are indicators provided to a second portion 132 of the data store 130 (referred to as "indicator data store 132").

Besides the static analysis logic 122 and the dynamic analysis logic 124, the memory 120 includes software that controls functionality of the processor 110, such as correlation logic 180. The correlation logic 180 analyzes certain received indicators for patterns and/or sequences that are associated with known (e.g., previously detected) malware or other cyber-attacks, as described below. The analyses conducted by the correlation logic 180 are governed, at least in part, by correlation rules loaded into the rules database 140.

The rules database 140 includes a first plurality of correlation rules for use in determining "strong" indicators from a subset of the indicators stored in the indicator data store 132 along with a second plurality of correlation rules for use in determining whether any "strong" indicators are uncovered from a combination of a plurality of "weak" indicators. The second plurality of correlation rules are configured to now analyze indicators that were not fully considered. It is contemplated that the correlation rules within the rules database 140 may be dynamic to select various combinations of indicators for analysis, where the selected combinations (groups) may be static (i.e. preselected indicators) or dynamic in nature. The dynamically selected groups may be based on a weighting scheme where certain combinations of "weak" indicators, which are generally known from machine learning or experiential knowledge from past analyses of indicators known to have higher levels of correlation to indicators associated with known malware or other cyber-attacks, are selected as part of the group.

The network interfaces $150_1$-$150_M$ may include one or more network ports containing the mechanical, electrical and/or signaling circuitry needed to connect the cyber-attack analysis system 100 to a network to thereby facilitate communications to other remotely located electronic devices. To that end, the interfaces $150_1$-$150_M$ may be configured to transmit and/or receive messages using a variety of communication protocols, as described elsewhere herein. As an illustrated example, a first interface $150_1$ may be adapted to receive data traffic propagating over the monitored enterprise network (or a copy thereof) while a second interface 150₂ may be adapted to receive indicators from one or more network (source) devices 190 remotely located from the cyber-attack analysis system 100. Additionally, a third network interface 1503 may be adapted to receive security content including software-based correlation rules 195 from a remote source. The correlation rules 195 are processed by the correlation logic 180 in determining whether any combination of (weak) indicators results in the finding of a strong indicator. The contents of the strong indicator are reported by a network administrator by reporting logic 185 via a fourth interface 1504 (described below).

Operability of the Cyber-Attack Analysis System

Figure 2:
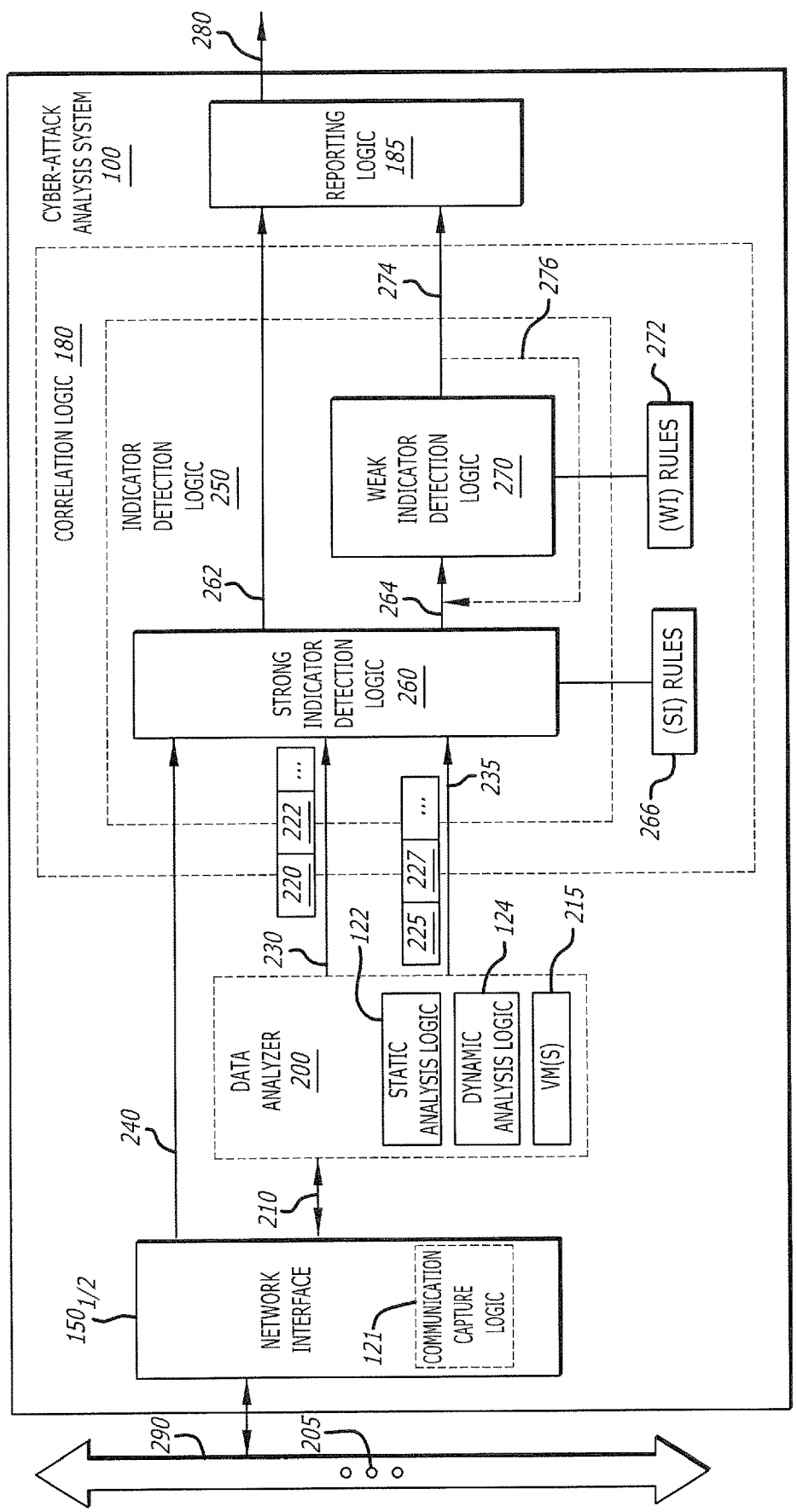
FIG. 2 is an exemplary block diagram of a logical representation of the cyber-attack analysis system of FIG. 1 including operability of correlation logic for use in generating a strong indicator from a group of weak indicators.

Referring now to FIG. 2, an exemplary block diagram of a logical representation of the cyber-attack analysis system 100 of FIG. 1 that illustrates the correlation logic 180 for use in generating a strong indicator from a plurality of weak indicators is shown. Herein, the cyber-attack analysis system 100 features a network interface 150 with an optional communications capture logic 121, an optional data analyzer 200, the correlation logic 180, and the reporting logic 185. The data analyzer 200 is adapted to receive data 210 as one or more objects from data traffic 205 being routed over an enterprise network 290. The functionality of the data analyzer 200 is based, at least in part, on the static analysis logic 122 and/or the dynamic analysis logic 124 as described above.

More specifically, network interface 150 may be configured to receive communications being transmitted as part of the internal network traffic 205. The communications capture logic 121 extracts one or more objects, for example, one or more related communications or contents of one or more related communications and provides the object or objects 210 (hereinafter, "object") to the data analyzer 200. The data analyzer 200 (e.g., static analysis logic 122 functionality) may be configured to analyze the object, for example, the communication or its contents constituting the object 210. Hence, the data analyzer 200 (e.g., static analysis logic 122 functionality) may determine characteristics of the object 210, such as the object name, object type, object size, source IP address (corresponding to a network device, e.g., device 102), destination IP address (corresponding to a network device, e.g., device 104), presence of particular fields, formats, parameters or structures, or the like. The characteristics may be provided as part of the indicators 230 to the correlation logic 180 along with metadata associated with these characteristics. Examples of metadata may include, but are not limited or restricted to an object identifier (ID), time-stamps each identifying the time of detection of the characteristics for example.

The dynamic analysis logic 124 is configured to process the object 210, where such processing may occur before, after or contemporaneously (i.e., at least partially occurring at the same time) with the analysis performed by the static analysis logic 122. The processing may be performed by at least one virtual machine (VM) 215, operating as part of the dynamic analysis logic 124, which executes the object 210 and monitors resultant behaviors 225. The monitored behaviors 225 may include (i) behaviors of the object 210 during processed within the VM 215, (ii) behaviors of software (e.g., operating system, applications, etc.) that is processing the object 210 within the VM 215, and/or (iii) behaviors of the VM 215 itself. Metadata 227 associated with the behaviors 225, such as a time-stamp identifying the time of occurrence of each behavior or a source of code whose execution caused the behavior for example, may be collectively provided as indicators 235 to the correlation logic 180. These indicators 230 and 235 are identified as being sourced by the cyber-attack analysis system 100.

Furthermore, in some embodiments, indicators (e.g., characteristics and/or behaviors) 240 resulting from cyber-attack analyses by one or more network devices (e.g., network devices 190 of FIG. 1) separate from the cyber-attack analysis system 100 are provided to the correlation logic 180 by the network interface 150. These indicators 240 circumvent the data analyzer 200.

Figure 3:
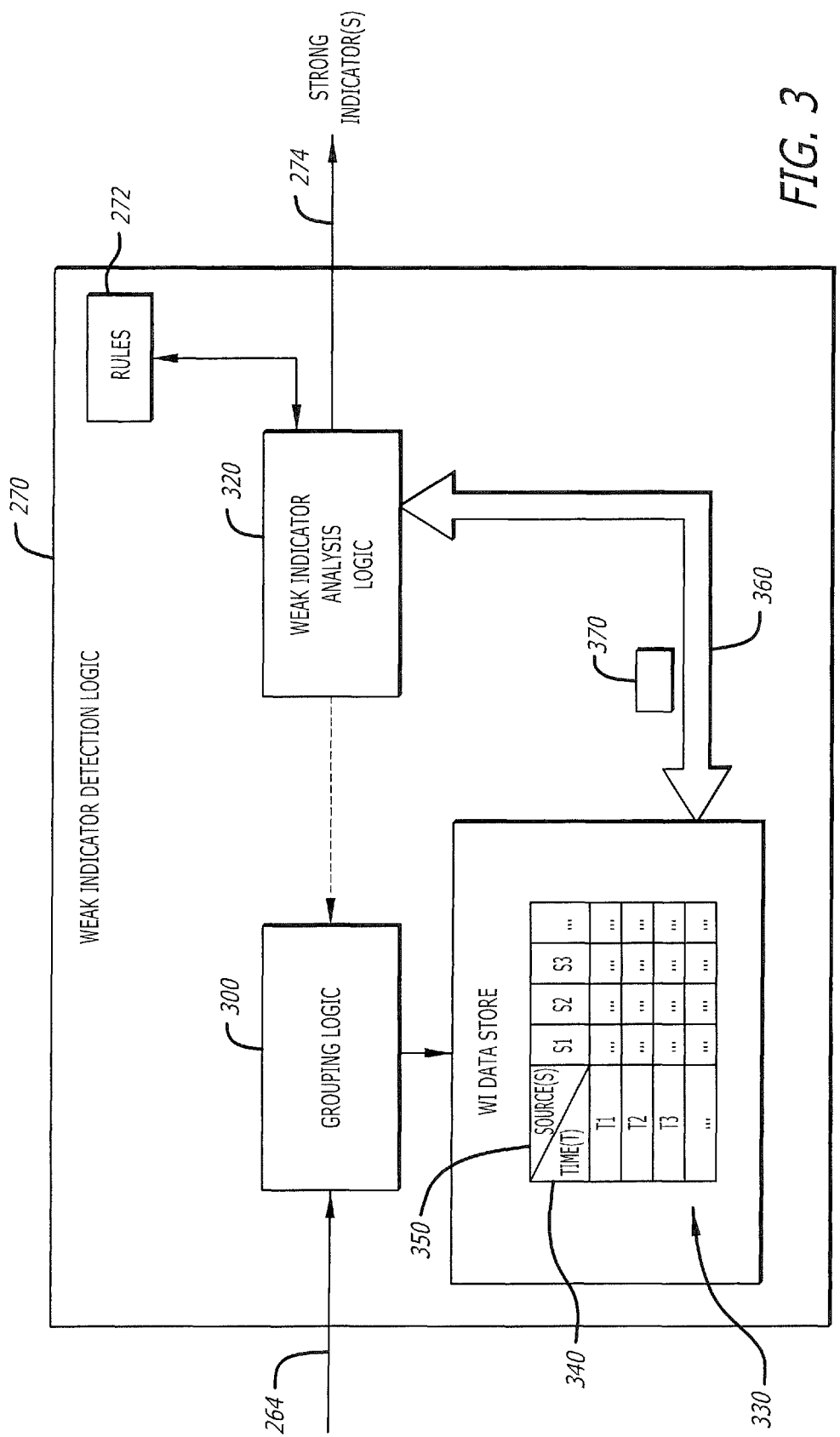
FIG. 3 is an exemplary embodiment illustrating weak indicator detection logic of FIG. 2.

The correlation logic 180 comprises indicator detection logic 250. According to one embodiment of the disclosure, the indicator detection logic 250 features a strong indicator detection logic 260 and a weak indicator detection logic 270. The strong indicator detection logic 260 and the weak indicator detection logic 270 may be deployed as separate logic or portions of the same logic that operates iteratively to detect any strong indicators 262. The detected strong indicators 262 are provided to the reporting logic 185, and thereafter, the remaining (weak) indicators 264 are grouped for further analysis as illustrated in FIG. 3 and described below.

Operating in accordance with a first plurality of correlation rules 266, which may be formulated through machine learning (e.g., prior results from analyses of other objects by the cyber-attack analysis system 100) and intelligence gathered from other sources (e.g., incident response analytics, third party analytics, etc.), the strong indicator detection logic 260 determines whether a first prescribed level of correlation exists between each of the indicators 235 and/or 240 and the indicators associated with known malware or other cyber-attacks. This correlation activity may include conducting comparisons between (i) any or all of the individual indicators 235 and/or 240 and (ii) indicators associated with known malware or other cyber-attacks, and optionally, one or more comparisons between (a) a plurality of the indicators 235 and/or 240 assembled in accordance with a first grouping scheme and (b) a first plurality of patterns and/or sequences of indicators associated with known malware or other cyber-attacks. Although not shown, the indicators associated with known malware or other cyber-attacks and the first plurality of patterns and/or sequences of indicators associated with known malware or other cyber-attacks may be statically or dynamically stored and accessible by the first plurality of correlation rules 266.

In response to the correlation exceeding a first threshold (e.g., a level of correlation greater than a particular threshold (e.g., percentage)), the individual indicator or indicators assembled in accordance with a first grouping scheme is provided as a strong indicator 262 to the reporting logic 185. Additionally, the individual indicators 235 and/or 240 that do not constitute "strong" indicators, referred to as the "set of indicators" 264, are provided to the weak indicator detection logic 270.

Operating in accordance with a second plurality of correlation rules 272, the weak indicator detection logic 270 determines whether a second prescribed level of correlation exists between certain groups of indicators assembled from the set of indicators 264 and a second plurality of patterns and/or sequences of indicators associated with known malware or other cyber-attacks. The second plurality of correlation rules 272, also formulated through machine learning and intelligence gathered from other sources, is different than the first plurality of correlation rules 266. For instance, the second plurality of correlation rules 272 may be directed on one or more patterns or sequences that are observed less frequently (or associated with less harmful malware) than patterns and/or sequences set forth in the first plurality of correlation rules 266. Also, the second prescribed level of correlation may be identical to, less, or greater than the first prescribed level of correlation.

The correlation operations performed by the weak indicator detection logic 270 may include one or more comparisons between (a) one or more groups of indicators assembled from the set of indicators 264 in accordance with a second grouping scheme and (b) the second plurality of patterns and/or sequences of indicators associated with known malware or other cyber-attacks, which partially or wholly differs from the first plurality of patterns and/or sequences of indicators associated with known malware or other cyber-attacks. Although not shown, the patterns and/or sequences of indicators associated with known malware or other cyber-attacks may be statically or dynamically stored and accessible by the second plurality of correlation rules 272.

Responsive to the comparison resulting in a measured correlation greater than a second prescribed threshold (e.g., the level of correlation being greater than a selected comparison percentage), the particular group or groups of indicators are provided as strong indicators 274 to the reporting logic 185. However, depending on the correlation rules 272, a particular group of indicators may be provided as feedback over line 276 to the weak indicator detection logic 270 for use in subsequent analyses. Of course, it is contemplated that the recursive feedback of indicators may be conducted for each weak indicator individually where the weak indicators may be grouped separately in subsequent analyses or a recursive feedback may be conducted for one or more strong indicators.

It is contemplated that the correlation logic 180 is rules driven. Hence, the correlation logic may be configured to issue an alert or not, reinject one or more weak indicator back into an internal data store of the weak indicator detection logic 270 for subsequent correlation analyses or reinject one or more strong indicators back into an internal data store of the strong indicator detection logic 260 for subsequent correlation analyses is rules dependent. According to one embodiment of the disclosure, once an indicator is identified as a strong indicator (e.g., results in an alert), the indicator will continue to remain as a strong indicator; however, one or more weak indicators, especially a pattern of a plurality of weak indicators, may be collectively determined to constitute a strong indicator.

The reporting logic 185 is configured to receive the "strong" indicators 262 and 274 from both the strong indicator detection logic 260 and the weak indicator detection logic 270, respectively. The reporting logic 185 is further configured to generate alerts 280 for display and evaluation by network administrators. In accordance with one embodiment, an "alert" includes a message that includes display or other user presentation of information that specifies a cyber-attack is in progress or has occurred and may also identify the strong indicators that support the determination of the cyber-attack.

Referring to FIG. 3, an exemplary embodiment illustrating the weak indicator detection logic 270 of FIG. 2 is shown. The weak indicator detection logic 270 features grouping logic 300, a first data store 310 (separate or part of data store 130), and weak indicator analysis logic 320. The grouping logic 300 is configured to organize the set of indicators 264 into a prescribed schema for storage in the first data store 310. The first schema allows for selective fetching of indicators by the weak indicator analysis logic 270 in accordance with the second plurality of correlation rules 272. For instance, as an illustrative example, indicators 330 partially forming the set of indicators 264 may be stored within the first data store 310 in accordance with the first schema. The indicators 330 may be indexed according to a first index parameter 340 (e.g., time as represented by a timestamp issued when the indicator is detected) and a second index parameter 350 (e.g., the source that provided the indicators 330, which may be represented by a source identifier such as a source IP address, host name, user name, media access control "MAC" address, or the like). Of course, besides the first schema, other schemas may be utilized by the grouping logic 300.

Based on the second plurality of correlation rules 272, the weak indicator analysis logic 320 accesses one or more groups of indicators within the first data store 310 via medium 360. Within the first data store 310, the indicators 330 are organized in accordance with one or more selected index parameters such as a time window, one or more indicator types including an identifier (e.g., source identifier, destination identifier, geographic location identifiers, etc.), or an operation event (e.g., log-on/off, data download, file operation, crash, etc.). The time window may vary in duration depending on the available resources (e.g., processing capacity, memory, etc.) within the cyber-attack analysis system 100, where the time window may be increased in size as more resources are available without hampering normal operability of the cyber-attack analysis system 100. Hence, window size may be determined based on the amount of available resources, and thus, is platform dependent.

For example, the window size is adjusted with a smaller duration (e.g., 1-2 minutes) when operating within a network device due to a constraint in resources (e.g., CPU and memory). However, when the cyber-attack analysis system 100 or the weak indicator detection logic 270 is running within a public or private cloud service (e.g., Amazon Web Services "AWS", Microsoft® Azure, etc.), the window size may be increased to over an hour and allow the correlation of a longer sequence of events.

Based on the correlation rules 272, a group of indicators 370 from a particular source or sources and/or within a selected time window (e.g., a sliding time window normally less than two minutes) may be fetched by the weak indicator analysis logic 320. The group of indicators 370 is analyzed by the weak indicator analysis logic 320 to determine whether a measured correlation greater than the second prescribed threshold exists between (i) the indicators 330 and (ii) the second plurality of patterns and/or sequences of indicators associated with known malware or other cyber-attacks. If so, the group of indicators 370 constitutes a "strong" indicator and information associated with the group of indicators 370 (and/or the indicators 370 as well) may be provided to the reporting logic 185.

Figure 4:
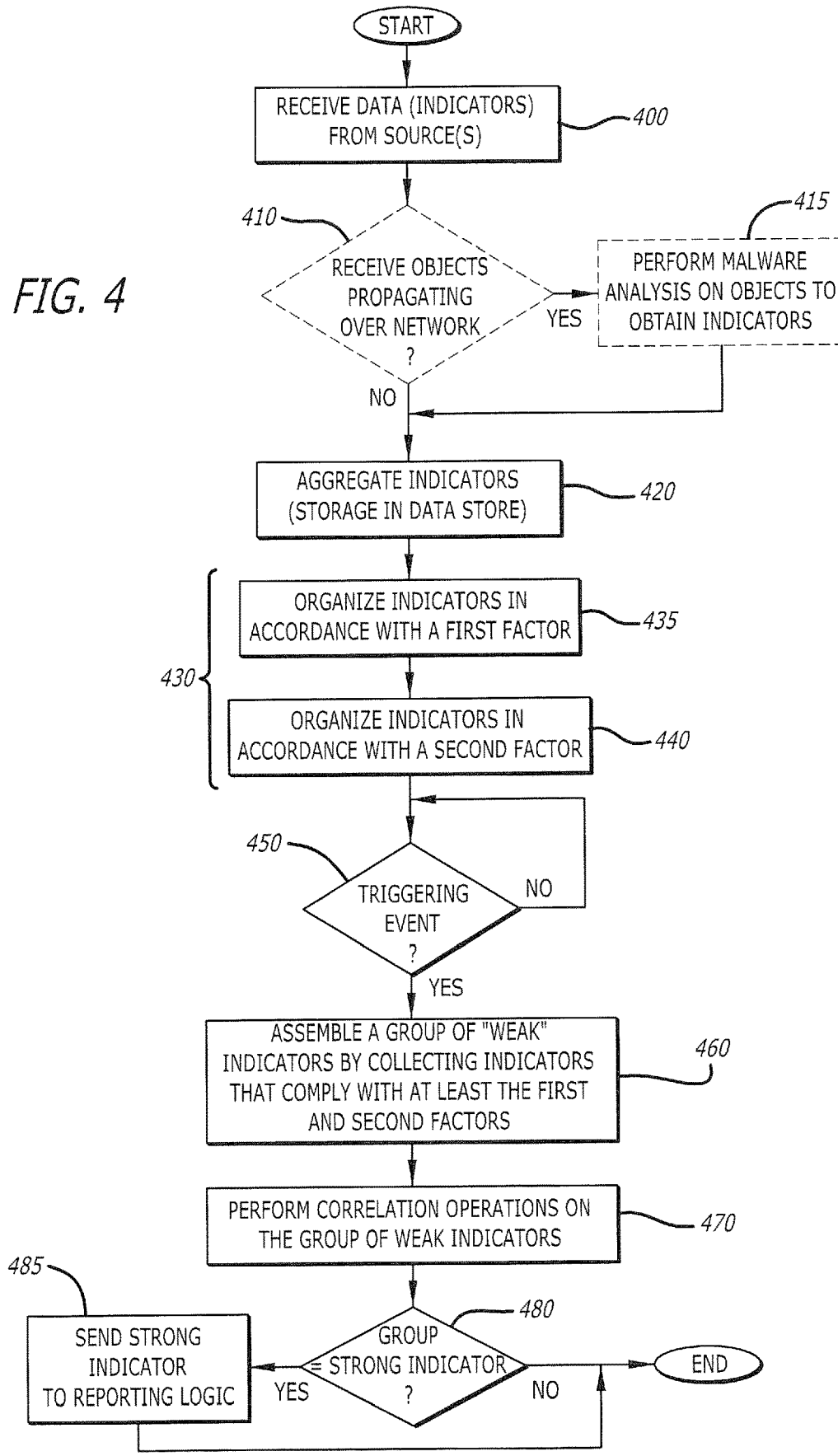
FIG. 4 is an exemplary embodiment of a flowchart illustrating operations of the weak indicator detection logic of FIG. 3.

Referring to FIG. 4, an exemplary embodiment of a flowchart illustrating operations of the weak indicator detection logic of FIG. 3 is shown. Initially, data is received from one or more sources (block 400). The data may include indicators that represent characteristics uncovered by or behaviors monitored during analyses of objects conducted by one or more sources different than the cyber-attack analysis system. As an optional additional source, the cyber-attack analysis system may further receive and analyze objects from internal network traffic propagating over an enterprise network, and if so, any indicators produced from the analysis of the internal network traffic by the cyber-attack analysis system are aggregated with the incoming indicators (blocks 410, 415 and 420). For these aggregated indicators, each indicator has insufficient correlation with indicators associated with known malware or other cyber-attacks to cause the weak indicator analysis device to conclude that the indicator represents a "strong" indicator by itself.

Thereafter, the aggregated indicators are organized in accordance with a plurality of index parameters forming the first schema (block 430). For instance, as an illustrated example, the aggregated indicators may be organized in accordance with a first index parameter (e.g., by time of occurrence of the indicator) and a second index parameter (e.g., by source identifier) as illustrated in blocks 435 and 440. The organization can be conducted in accordance with multiple index parameters utilized by the second plurality of correlation rules that at least partially control operability of the weak indicator detection logic 270 within the cyber-attack analysis system 100 of FIGS. 1-3. Other index parameters may include, but are not limited or restricted to destination identifier (e.g., destination IP address or other referencing information), geographic location identifier, or the like In response to a triggering event (e.g., a predetermined amount of data is loaded in the first data store 310 of FIG. 3, a predetermined amount of time has elapsed, etc.), the weak indicator detection logic accesses and operates in accordance with the second plurality of correlation rules by collecting those "weak" indicators that reside with the time and source type constraints set forth in the second plurality of correlation rules (blocks 450 and 460). Therefore, weak indicator detection logic performs a correlation operation on different combinations (groups) of collected weak indicators to patterns and/or sequences associated with known malware or other cyber-attacks (block 470). If any of these groups correlates (i.e., matches to a sufficient degree) the patterns and/or sequences associated with known malware or other cyber-attacks, the group is reported to the reporting logic (blocks 480 and 485). Otherwise, the weak indicators may not offer any additional information for assisting the cyber-attack analysis system in determining whether a cyber-attack is being conducted and which source (and identifiers) is associated with the cyber-attack.

Figure 5A:
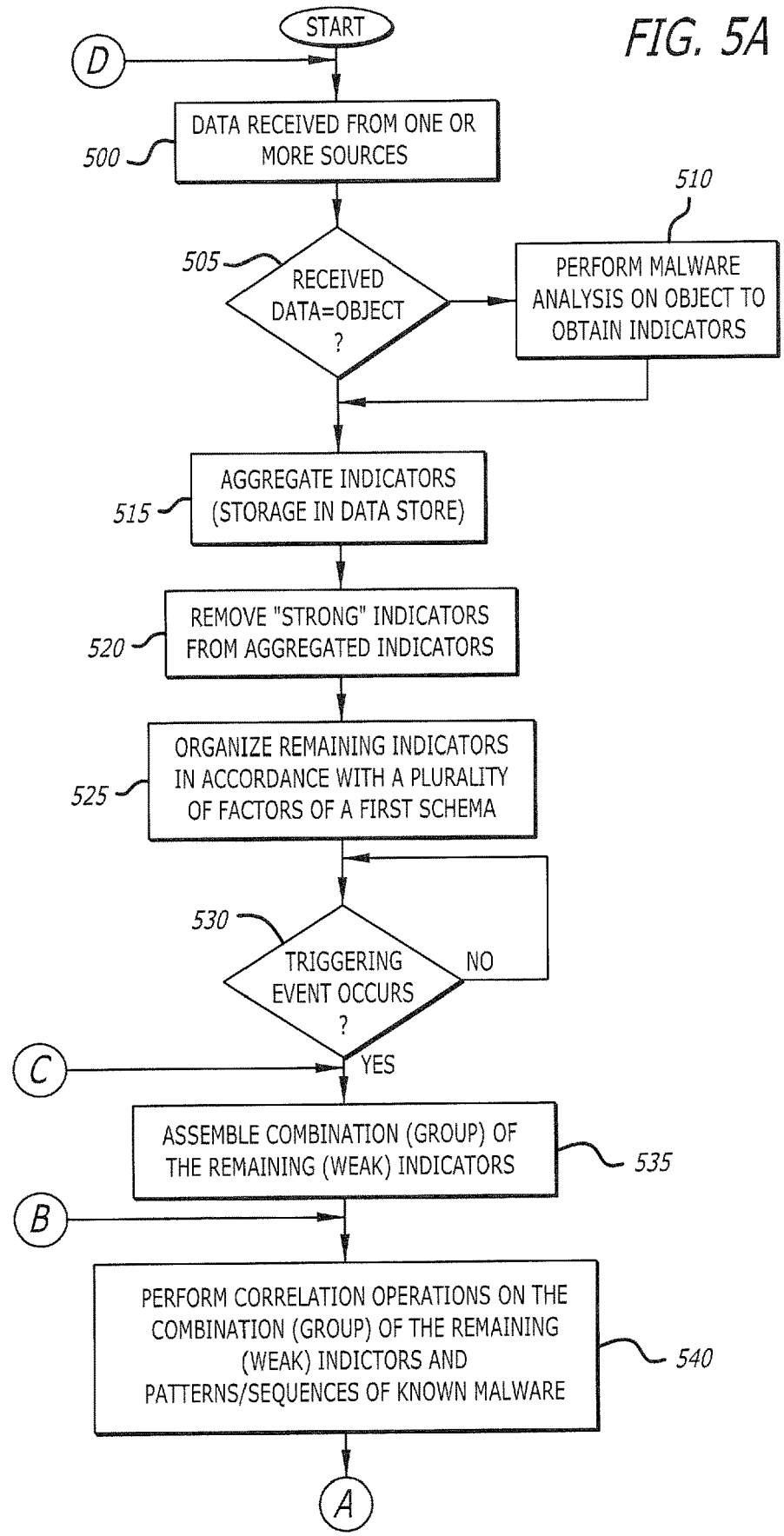
FIGS. 5A and 5B provide a more detailed embodiment of a flowchart illustrating the operations of the weak indicator detection logic of FIG. 3.
Figure 5B:
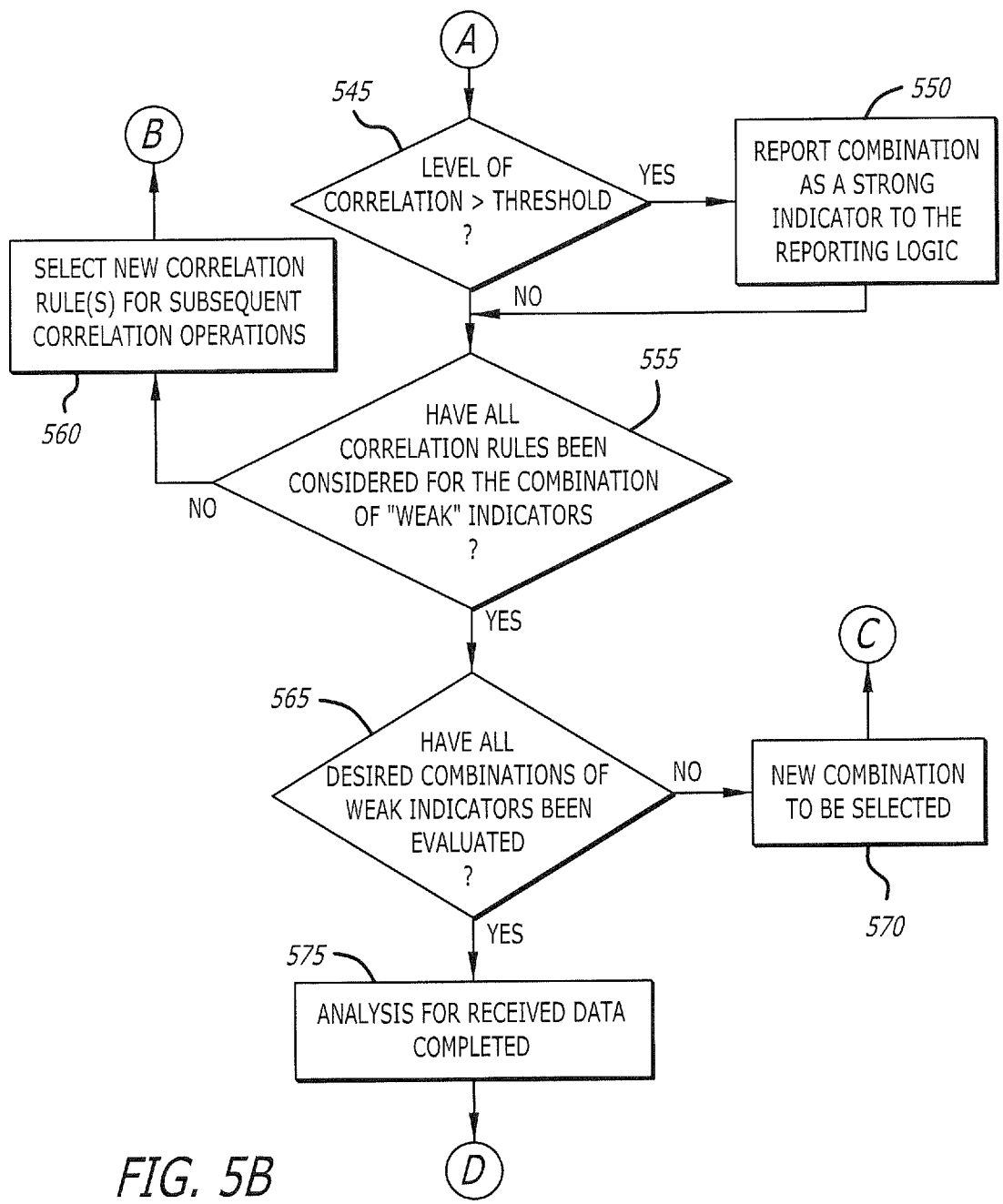

Referring now to FIGS. 5A and 5B, a more detailed embodiment of a flowchart illustrating the operations of the weak indicator detection logic of FIG. 3 is shown. Herein, data is received from one or more sources (block 500). A first determination is made whether the received data represents an object obtain from the internal network traffic, and if so, the object undergoes one or more analyses, which produce a plurality of indicators to be utilized for analysis (blocks 505 and 510). Otherwise, the received data represents characteristics uncovered or behaviors monitored during analyses of objects conducted by one or more sources different than the cyber-attack analysis system, which constitute a plurality of indicators that are aggregated (block 515).

For these indicators, the "strong" indicators may be removed (block 520). More specifically, an analysis is conducted for each of these indicators to determine whether a correlation between that indicator and one or more indicators associated with known malware or other cyber-attacks exceeds a first threshold. If so, the indicator is a "strong" indicator. The remaining indicators are considered to be the "weak" indicators.

Thereafter, the "weak" indicators are organized in accordance with a plurality of index parameters forming the first schema (block 525). As an illustrated example, the "weak" indicators may be organized in accordance with a first index parameter (e.g., by time of occurrence of the indicator thereby organized in accordance with a sliding window where the weak indicators reside within a prescribed time period) and a second index parameter, such as the identifier of the source of the indicator, referred to as the "source identifier." In some embodiments, the organization can be conducted in accordance with a single parameter or multiple parameters.

In response to a selected triggering event (e.g., the "weak" indicators are loaded in a data store, expiration of a prescribed time where periodic analyses are conducted, receipt of the data, etc.), correlation operations are performed on different combinations (groups) of "weak" indicators and patterns and/or sequences associated with known malware or other cyber-attacks (blocks 530, 535 and 540). The correlation operations may be in accordance with one or more of the second plurality of correlation rules. If any of these combinations correlates to any patterns and/or sequences associated with known malware or other cyber-attacks, the combination of weak indicators corresponds to a strong indicator, and thus, information associated with the strong indicator (and perhaps the combination of weak indicators themselves) is reported to the reporting logic (blocks 545 and 550).

Otherwise (and concurrently or after the reporting of the strong indicator in blocks 545 and 550), a determination is made as to whether all of the second plurality of correlation rules have been considered in an analysis of the combination of weak indicators (block 555). If not, correlation operations in accordance with different correlation rule(s) may be performed on the combination of weak indicators (blocks 560 and 540-545). If so, a determination is made as to whether all combinations of the weak indicators have been evaluated (block 565). If all combinations of the weak indicators have not been evaluated, a new combination of weak indicators is selected and undergo the correlation operations with the patterns and/or sequences associated with known malware or other cyber-attacks (blocks 570 and 535-550). Otherwise, the analysis of the received data is completed for the received data, but continues in an iterative manner (block 575).

Figure 6A:
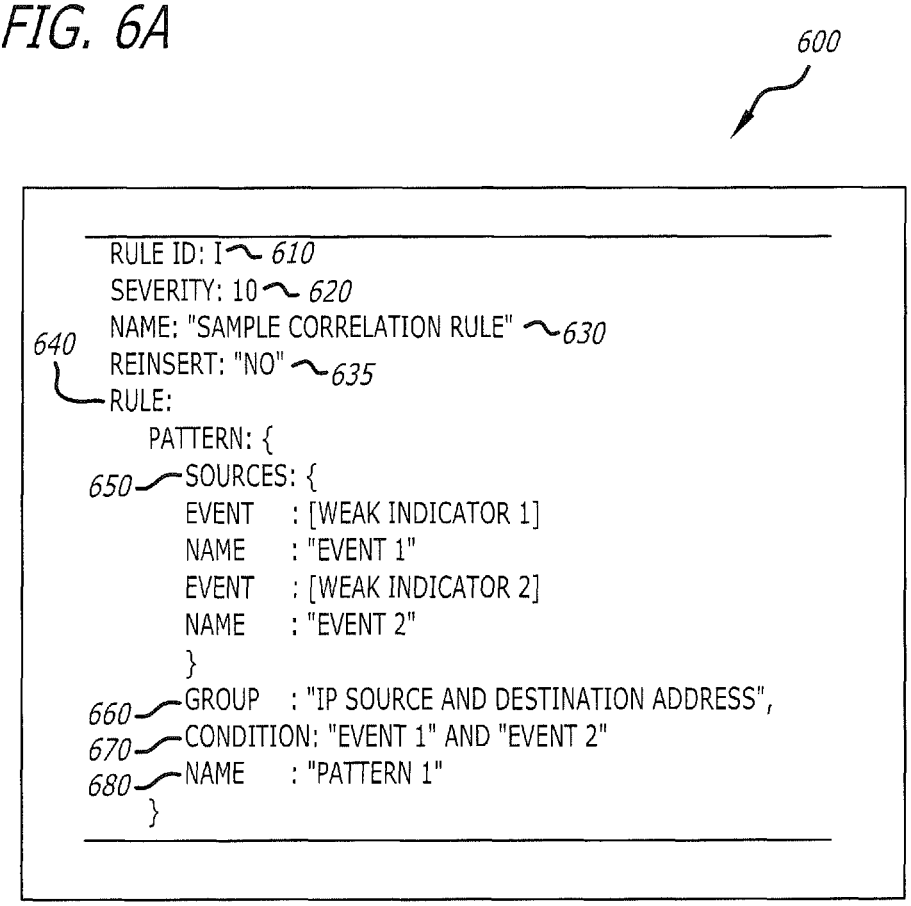
FIGS. 6A and 6B are exemplary block diagrams of the operability of the weak indicator detection logic of FIG. 3.
Figure 6B:
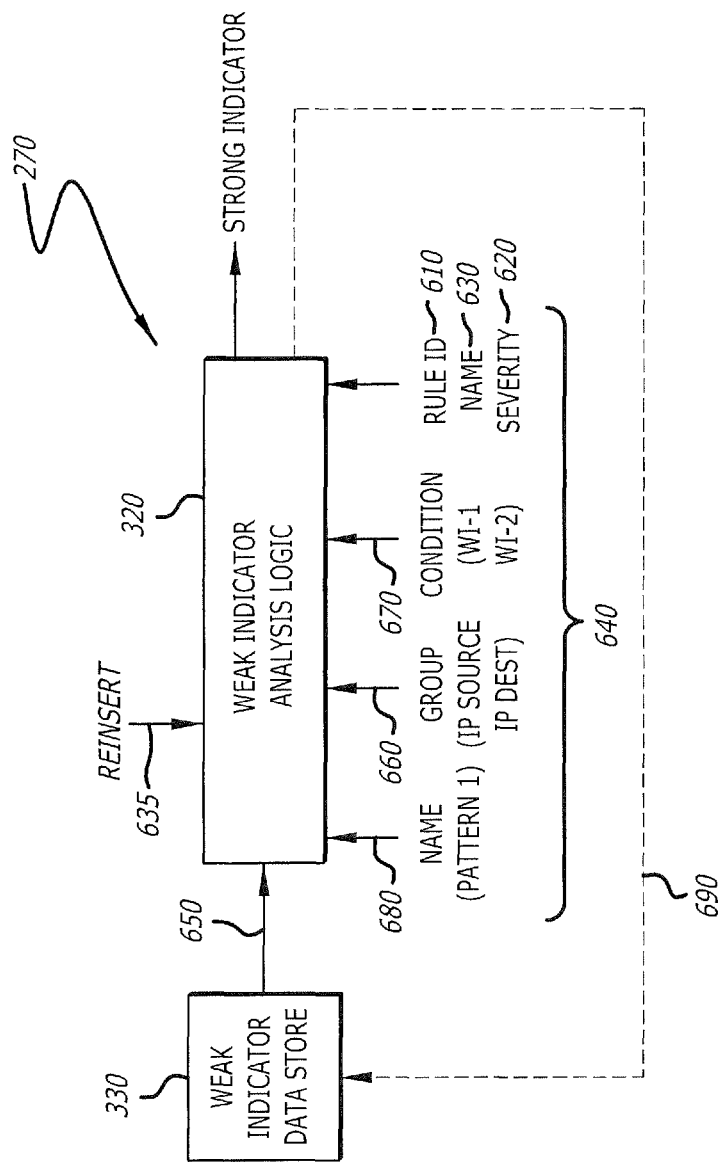

Referring to FIGS. 6A and 6B, a first exemplary block diagram of the operability of the weak indicator detection logic 270 of FIG. 3 is shown. In general, the weak indicator detection logic 270 includes a weak indicator analysis logic 320 that is adapted to receive one or more rules that control its operability in grouping and subsequent analysis of weak indicators. The analysis is conducted to determine whether this particular grouping of weak indicators constitutes a "strong' indicator, which signals a potential cyber-attack. Exemplary pseudo-code 600 of a first rule is shown in FIG. 6A and the block diagram of the logical operations is show in FIG. 6B.

Herein, the "Rule Id 1" 610 is directed to an identifier assigned to a pattern (e.g., "pattern 1") that includes a number of events (weak indicators). Any matching results are assigned a particular level of severity 620 (e.g., the highest severity being "10" out of 10). The severity 620 may identify, upon successful detection of the particular pattern (weak indicator 1 followed by weak indicator 2), a cyber-attack has been attempted (or is in process). Additionally, or in the alternative, the cyber-attack analysis system may utilize the severity 620 to determine an ordering of processing (e.g., rules associated with the highest severity are processed first with rules associated with lesser severity are processed as time permits).

The "name" field 630 is utilized to subsequently reference a particular collection (pattern) of indicators that are analyzed in accordance with a specified rule 640. The rule 640 identifies sources of the indicators (source field) 650, grouping scheme (group field) 660, analysis particulars (condition field) 670 and a pattern name 680 assigned to the newly analyzed patterns of weak indicators. The condition field 670 identifies what combination of index parameters are relied upon for grouping of the incoming indicators from sources. For this illustrative embodiment, the incoming indicators are group by IP source address and IP destination address, as identified in the group field 660. Of course, it is contemplated that other index parameters may be used. The condition field 670 specifically describes the particular pattern under review after grouping of the weak indicators. For this example, the cyber-attack analysis system is looking for a pattern in which a particular group (source and destination IP addresses) undercovers a targeted sequence 670 of events (e.g., first weak indicator "WI-1", second weak indicator "WI-2"). Upon detection of the matching sequence, a strong indicator has been determined from a sequence of weak indicators.

It is contemplated that the components forming the rules are modifiable and can be organized in a plurality of nesting arrangements. For example, as shown in FIG. 6B, the sequence of weak indicators associated with "pattern 1" 680 may be provided as input feedback 690 to the weak indicator analysis logic 320 (or data store 330) for subsequent correlation analysis as a separate weak indicator for a different correlation rule. Stated differently, certain rules may be coded to require that, instead of issuing an alert or a message as to detection of the sequence of weak indicators (i.e., "pattern 1" 680) that fail to arise to "strong" indicator status, the sequence of indicators is reinserted as input back into the analysis stage for future correlation. This may be accomplished by setting the Reinject keyword 635 to "Yes" instead of "No" (no feedback) as shown in FIG. 6A.

In the foregoing description, the invention is described with reference to specific exemplary embodiments thereof. It will, however, be evident that various modifications and changes may be made thereto without departing from the broader spirit and scope of the invention as set forth in the appended claims.

What is claimed is:

1. A computerized method for detecting a cyber-attack during lateral movement within a network, the method comprising:
monitoring a plurality of communications within the network between a first network device and a second network device of the network, the plurality of communications comprising a plurality of objects;
determining a plurality of indicators from a cyber-attack analysis of the plurality of objects, the plurality of indicators including a first plurality of weak indicators;
extracting a second plurality of weak indicators from the first plurality of weak indicators;
performing a correlation operation between the second plurality of weak indicators and one or more patterns or sequences of indicators associated with known cyber-attacks; and
generating and issuing a report based on results from the correlation operation.

2. The computerized method of claim 1, wherein each weak indicator of the first plurality of weak indicators, including a first weak indicator, corresponds to data that, by itself, is not definitive as to whether the data is associated with a cyber-attack.

3. The computerized method of claim 2, wherein prior to extracting the second plurality of weak indicators, the method further comprising:
separating one or more strong indicators from the plurality of indicators, with remaining indicators of the plurality of indicators corresponding to the first plurality of weak indicators, wherein
the first weak indicator corresponds to data that, based on its presence alone, represents a likelihood of the cyber-attack being conducted on a source of the first weak indicator being less than a first probability level, wherein the source being one of the first network device or the second network device, and
a first strong indicator of the one or more strong indicators corresponds to data that, based on its presence alone, represents a likelihood of the cyber-attack being conducted on the source exceeds a second probability level, the second probability level being greater than or equal to the first probability level.

4. The computerized method of claim 1, wherein extracting of the second plurality of weak indicators comprises combining two or more weak indicators in accordance with one or more grouping factors.

5. The computerized method of claim 4, wherein the one or more grouping factors comprise an index parameter.

6. A system for detecting a cyber-attack within east-west traffic of a network, comprising:
a processor; and
a memory communicatively coupled to the processor, the memory comprises
a data analyzer configured, when executed by the processor, to conduct one or more analyses of an object extracted from network traffic propagating between a first network device and a second network device within the network, the one or more analyses producing results including a plurality of indicators, and
indicator detection logic communicatively coupled to the data analyzer, the indicator detection logic including software that is configured to, when executed by the processor, (i) identify a plurality of weak indicators within the plurality of indicators, (ii) assemble one or more groups of weak indicators from the plurality of weak indicators, and (iii) compare one or more patterns or sequences of indicators associated with known malware or cyber-attacks to the one or more groups of weak indicators to detect whether any of the one or more groups of weak indicators constitutes a strong indicator representing that a cyber-attack has occurred on the first or second network device.

7. The system of claim 6, wherein each weak indicator of the plurality of weak indicators, including a first weak indicator, corresponds to data that, by itself, is not definitive as to whether the data is associated with a cyber-attack.

8. The system of claim 6, wherein the indicator detection logic comprising:
first indicator detection logic communicatively coupled to the data analyzer, the first indicator detection logic, when executed by the processor, is configured to determine whether a prescribed level of correlation exists between each of the plurality of indicators and the one or more patterns or sequence indicators associated with known malware or cyber-attacks to detect whether any of the plurality of indicators constitutes a strong indicator representing that a cyber-attack has occurred on a compromised computing system; and
second indicator detection logic communicatively coupled to the first indicator detection logic, the second indicator detection logic, when executed by the processor, is configured to perform a correlation operation between (i) each of the one or more groups of weak indicators, being a subset of the plurality of indicators, and (ii) the one or more patterns or sequences of indicators associated with known malware or cyber-attacks.

9. The system of claim 8 further comprising:
reporting logic communicatively coupled to the first indicator detection logic and the second indicator detection logic, the reporting logic, when executed by the processor, is configured to generate an alert at least in response to detection of the strong indicator formed by a group of weak indicators of the one or more groups of weak indicators by the second indicator detection logic.

10. The system of claim 8, wherein the first indicator detection logic, when executed by the processor, is configured to operate in accordance with a first plurality of correlation rules and the second indicator detection logic operating in accordance with a second plurality of correlation rules.

11. The system of claim 10, wherein a group of weak indicators of the one or more groups of weak indicators includes two or more indicators assembled by grouping the two or more indicators in accordance with a first grouping scheme conducted in accordance with the second plurality of correlation rules.

12. The system of claim 11, wherein the second indicator detection logic comprises
a data store to store the two or more indicators,
grouping logic communicatively coupled to the data store, the grouping logic, when executed by the processor, is configured to organize the plurality of weak indicators, and
weak indicator analysis logic communicatively coupled to the data store, the weak indicator analysis logic, when executed by the processor, is configured to selectively collect the two or more indicators and perform the correlation operation between (i) the two or more indicators and (ii) the one or more patterns or sequences of indicators associated with known malware or cyber-attacks in accordance with the second plurality of correlation rules.

13. The system of claim 12, wherein the grouping logic, when executed by the processor, is configured to organize the plurality of weak indicators into a prescribed schema for storage in the data store.

14. The system of claim 13, wherein the prescribed schema is indexed based on a first index parameter and a second index parameter, wherein one of the first index parameter and the second index parameter is based on time and another of the first index parameter and the second index parameter is based on source.

15. The system of claim 6, wherein the indicator detection logic, when executed by the processor, is configured to identify the second plurality of weak indicators by combining two or more weak indicators in accordance with one or more grouping factors.

16. The system of claim 15, wherein the one or more grouping factors comprise an index parameter.

17. The system of claim 6, wherein each of the one or more groups of weak indicators shares a relatedness factor in accordance with one or more grouping rules, wherein the relatedness factor for a first group of the one or more groups of weak indicators comprises at least one of a prescribed time window, weightings assigned to each type of weak indicator in the first group of weak indicators, or frequency of occurrence of each weak indicator in the first group of weak indicators.

18. A method for detecting a cyber-attack after infiltration and during lateral movement within a network, comprising:
conducting one or more analyses of an object extracted from network traffic propagating from a first network device to a second network device within the network, the one or more analyses producing results including a plurality of indicators;
identifying a plurality of weak indicators from the plurality of indicators, each weak indicator of the plurality of weak indicators corresponds to data that, by itself, is not definitive as to whether the data is associated with a cyber-attack;
assembling one or more groups of weak indicators from the plurality of weak indicators;
comparing one or more patterns or sequences of indicators associated with known malware or cyber-attacks to each of the one or more groups of weak indicators to detect whether any of the one or more groups of weak indicators constitutes a strong indicator representing that a cyber-attack has occurred on a compromised computing system; and
generating an alert at least in response to detection of the strong indicator formed by a group of weak indicators of the one or more groups of weak indicators.

19. The method of claim 18, wherein each weak indicator of the plurality of weak indicators, including a first weak indicator, corresponds to data that, by itself, is not definitive as to whether the data is associated with a cyber-attack.

20. The method of claim 18, wherein each of the one or more groups of weak indicators shares a relatedness factor in accordance with one or more grouping rules, wherein the relatedness factor for a first group of the one or more groups of weak indicators comprises at least one of a prescribed time window, weightings assigned to each type of weak indicator in the first group of weak indicators, or frequency of occurrence of each weak indicator in the first group of weak indicators.

21. The method of claim 18, wherein a weak indicator is associated with (i) a low correlation with known cyber-attacks, (ii) a high correlation with normal or expected characteristics or behaviors (during execution) of client server traffic, or (iii) both.

22. A cyber-attack analysis system to detect cyber-attacks by analyzing client-server traffic, the system comprising:
a network interface including one or more network ports including circuitry needed to establish a connection to a network, the network interface to receive client-server traffic propagating in a network traffic including a plurality of communications between a client network device and a server network device;
analysis logic to analyze communications within the received network traffic to identify a set of indicators;
correlation logic to assemble one or more groups of weak indicators, each group including a plurality of weak indicators, from the set of indicators wherein a weak indicator corresponds to data that, by itself, is not definitive as to a cyber-attack, each of the one or more groups of weak indicators sharing a relatedness factor in accordance with one or more grouping rules, wherein the correlation logic conducts an analysis to determine whether each of the one or more groups of weak indicators is correlated with known malicious patterns or sequences of indicators, thereby producing at least one strong indicator and determining that a cyber-attack is being conducted based on presence of one or more strong indicators, and a reporting logic to report, via an input/output interface, the determination of the cyber-attack.

23. The cyber-attack analysis system of claim 22, wherein the relatedness factor for a first group of the one or more groups of weak indicators comprises at least one of a prescribed time window, weightings assigned to each type of weak indicator in the first group of weak indicators, or frequency of occurrence of each weak indicator in the first group of weak indicators.

24. The cyber-attack analysis system of claim 22, wherein a weak indicator represents a likelihood less than a first selected threshold of a cyber-attack.

25. The cyber-attack analysis system of claim 24, wherein the analysis logic, when executed by the processor, is further configured to separate one or more strong indicators from the set of indicators, with remaining indicators of the set of indicators corresponding to the plurality of weak indicators, wherein the weak indicator corresponds to data that, based on its presence alone, represents a likelihood of the cyber-attack being conducted on a source of the first weak indicator being less than a first probability level, wherein the source being one of the first network device or the second network device, and a first strong indicator of the one or more strong indicators corresponds to data that, based on its presence alone, represents a likelihood of the cyber-attack being conducted on the source exceeds a second probability level, the second probability level being greater than or equal to the first probability level.

26. The cyber-attack analysis system of claim 22, wherein a weak indicator is associated with (i) a low correlation with known cyber-attacks, (ii) a high correlation with normal or expected characteristics or behaviors (during execution) of client server traffic, or (iii) both.

27. The cyber-attack analysis system of claim 22, wherein the analysis logic comprises first indicator detection logic communicatively coupled to the data analyzer, the first indicator detection logic, when executed by the processor, is configured to determine whether a prescribed level of correlation exists between each of the plurality of indicators and the one or more patterns or sequence indicators associated with known malware or cyber-attacks to detect whether any of the plurality of indicators constitutes a strong indicator representing that a cyber-attack has occurred on a compromised computing system; and second indicator detection logic communicatively coupled to the first indicator detection logic, the second indicator detection logic, when executed by the processor, is configured to perform a correlation operation between (i) each of the one or more groups of weak indicators, being a subset of the plurality of indicators, and (ii) the one or more patterns or sequences of indicators associated with known malware or cyber-attacks.

28. The cyber-attack analysis system of claim 27, wherein the reporting logic is communicatively coupled to the first indicator detection logic and the second indicator detection logic, and wherein the reporting logic, when executed by the processor, is further configured to generate an alert at least in response to detection of the strong indicator formed by a group of weak indicators of the one or more groups of weak indicators by the second indicator detection logic.

29. The cyber-attack analysis system of claim 27, wherein the first indicator detection logic, when executed by the processor, is configured to operate in accordance with a first plurality of correlation rules and the second indicator detection logic operating in accordance with a second plurality of correlation rules.

30. The system of claim 29, wherein a group of weak indicators of the one or more groups of weak indicators includes two or more indicators assembled by grouping the two or more indicators in accordance with a first grouping scheme conducted in accordance with the second plurality of correlation rules.

31. The cyber-attack analysis system of claim 30, wherein the second indicator detection logic comprises a data store to store the two or more indicators, grouping logic communicatively coupled to the data store, the grouping logic, when executed by the processor, is configured to organize the plurality of weak indicators, and weak indicator analysis logic communicatively coupled to the data store, the weak indicator analysis logic, when executed by the processor, is configured to selectively collect the two or more indicators and perform the correlation operation between (i) the two or more indicators and (ii) the one or more patterns or sequences of indicators associated with known malware or cyber-attacks in accordance with the second plurality of correlation rules.

* * * * *